United States Patent [19]

Patterson

[11] Patent Number: 4,900,291
[45] Date of Patent: Feb. 13, 1990

[54] BICYCLE GEAR SHIFTING METHOD AND APPARATUS

[75] Inventor: Sam H. Patterson, Chicago, Ill.

[73] Assignee: Sram Corporation, Chicago, Ill.

[21] Appl. No.: 293,521

[22] Filed: Jan. 5, 1989

Related U.S. Application Data

[63] Continuation-in-part of Ser. No. 291,359, Dec. 29, 1988, abandoned, which is a continuation of Ser. No. 141,625, Jan. 6, 1988, abandoned.

[51] Int. Cl.[4] ............................................. F16H 9/24
[52] U.S. Cl. ........................................ 474/80; 74/488; 74/501.6
[58] Field of Search ..................................... 474/77–81; 74/473 R, 475, 480 R, 488, 489, 501.6; 280/289 R, 289 H

[56] References Cited

U.S. PATENT DOCUMENTS

| | | | |
|---|---|---|---|
| 4,055,093 | 10/1977 | Ross | 474/81 X |
| 4,194,408 | 3/1980 | Hedrich | 474/81 |
| 4,201,095 | 5/1980 | Cirami | 474/81 |
| 4,267,744 | 5/1981 | Yamasaki | 474/82 X |
| 4,384,864 | 5/1983 | Bonnard | 474/80 X |
| 4,693,700 | 9/1987 | Chappell | 474/80 |

Primary Examiner—Thuy M. Bui
Attorney, Agent, or Firm—Albert L. Gabriel

[57] ABSTRACT

A bicycle derailleur gear shifting system having a rotatable handgrip actuator cam which is coupled with the derailleur shifting mechanism through a control cable system so as to control the derailleur mechanism. Separate actuator cams are associated with the front and rear derailleurs. For the down-shifting direction, at least the rear derailleur cam is configured so as to substantially compensate for increasing force of the derailleur return spring; so as to substantially compensate for numerous cumulative lost motions in the derailleur shifting mechanism and cable system, and for chain gap variations; and so as to overshift the chain a sufficient amount beyond the destination freewheel sprocket so that the chain will approach the destination sprocket in the same direction as it would in the up-shift direction, but not sufficient to cause a double shift, or derailling from the #1 sprocket. A front derailleur cam is configured to provide fine-tuning for "cross-over" riding.

26 Claims, 13 Drawing Sheets

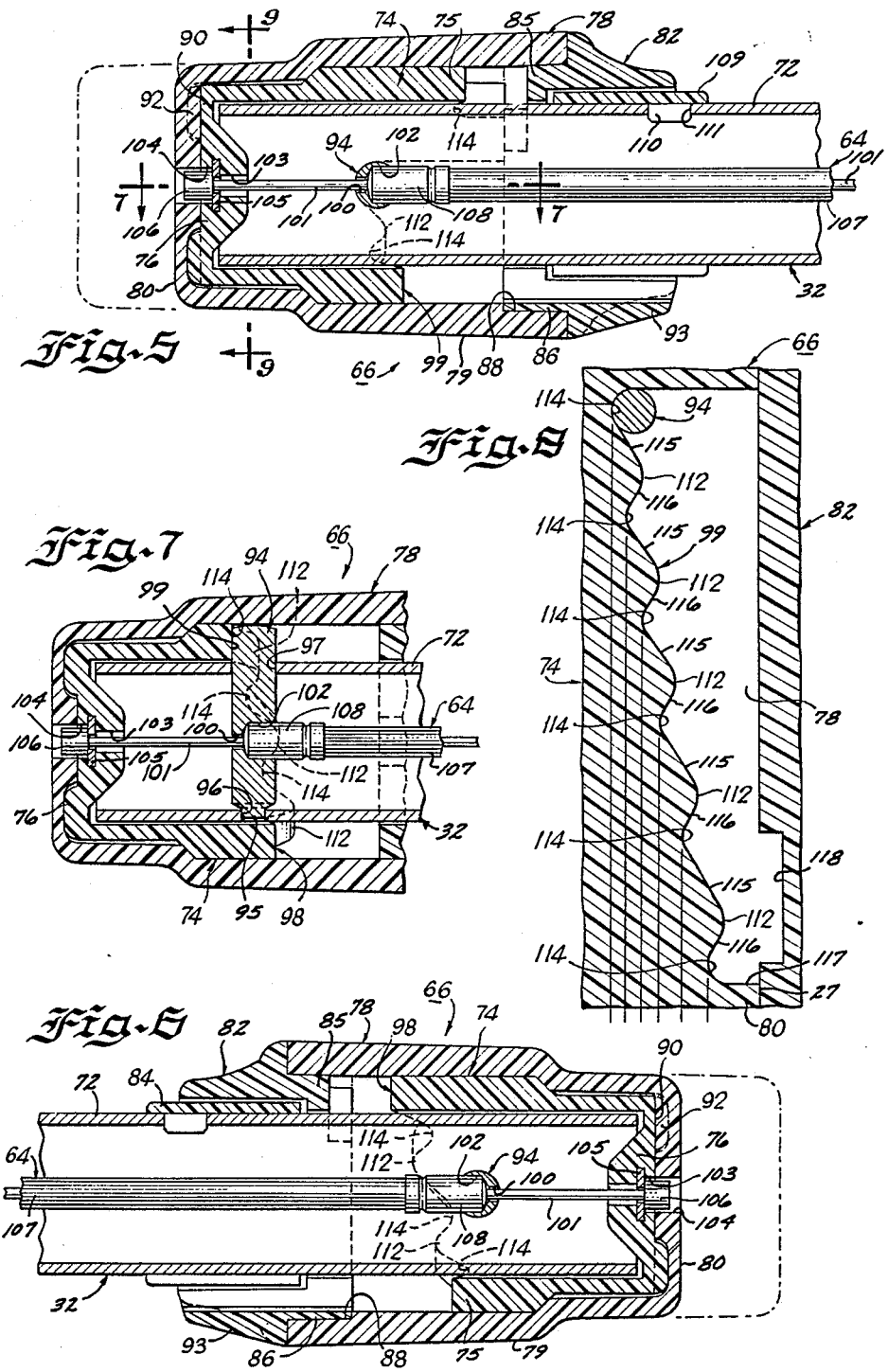

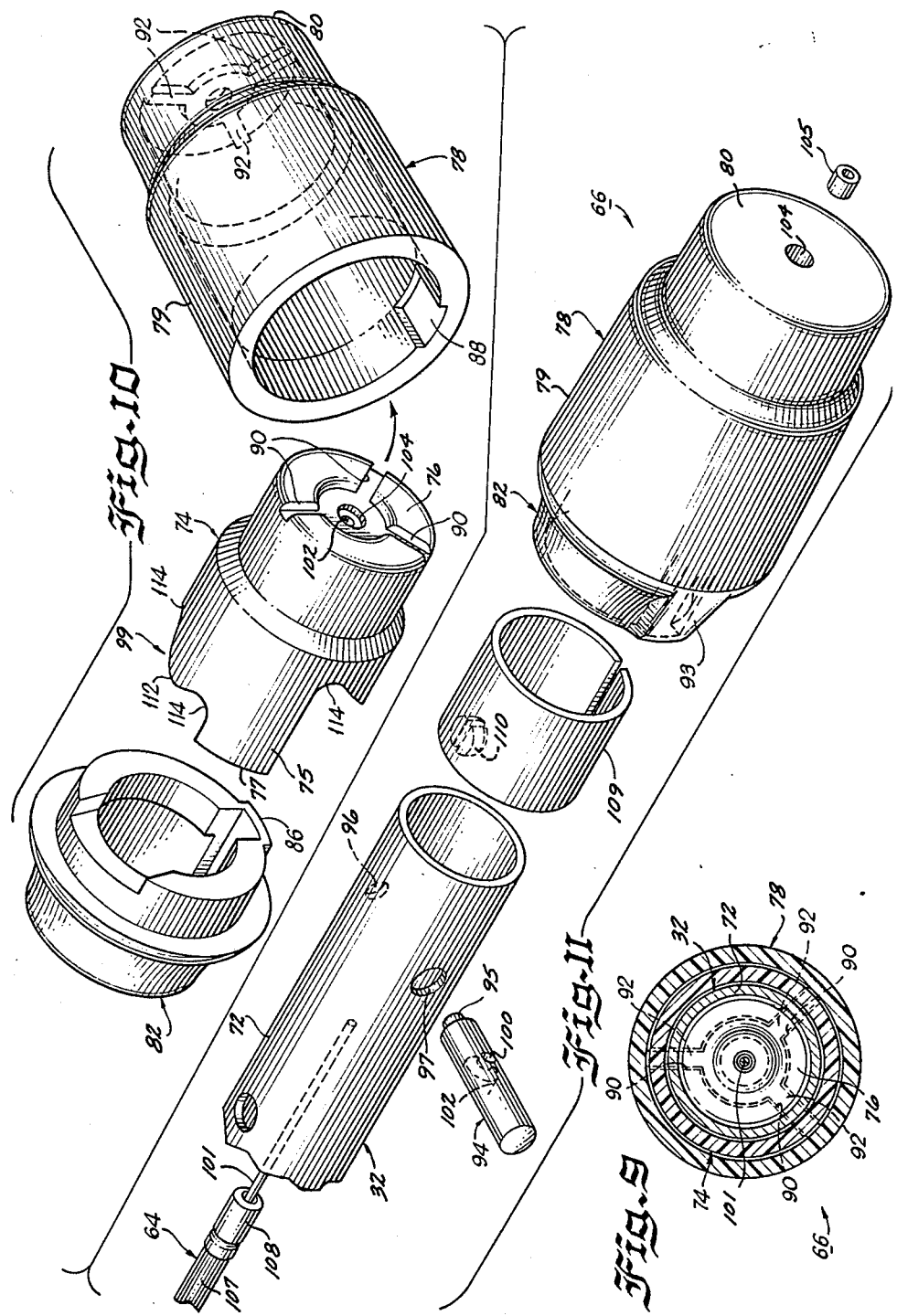

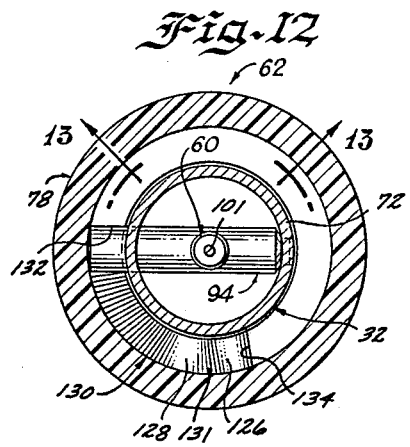
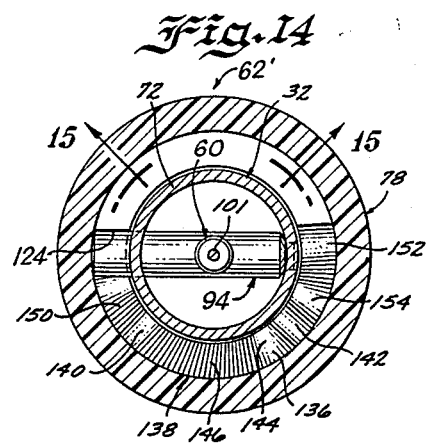
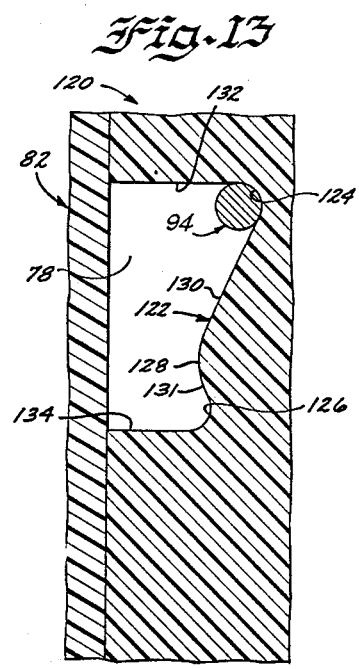
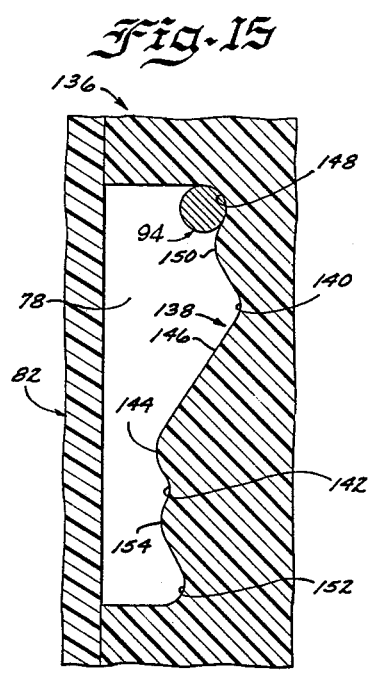

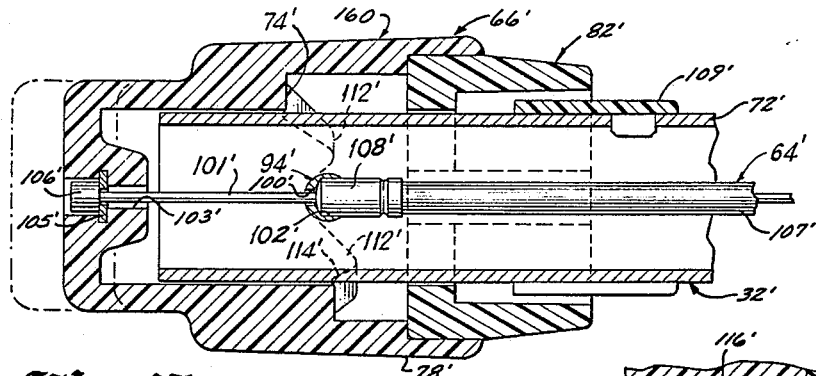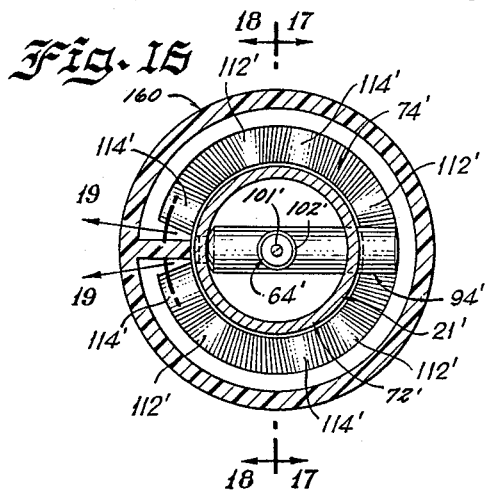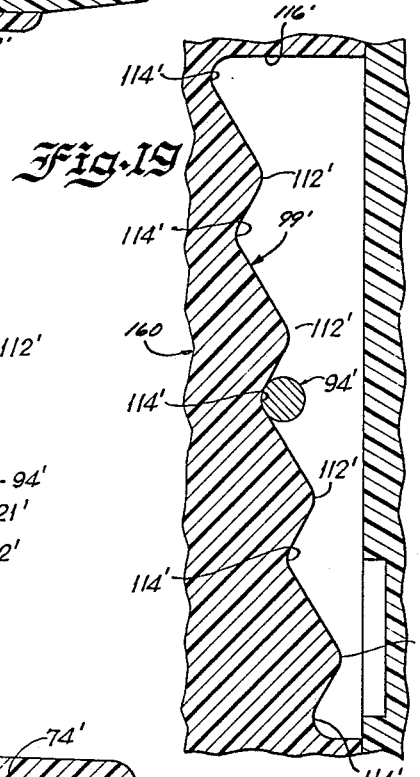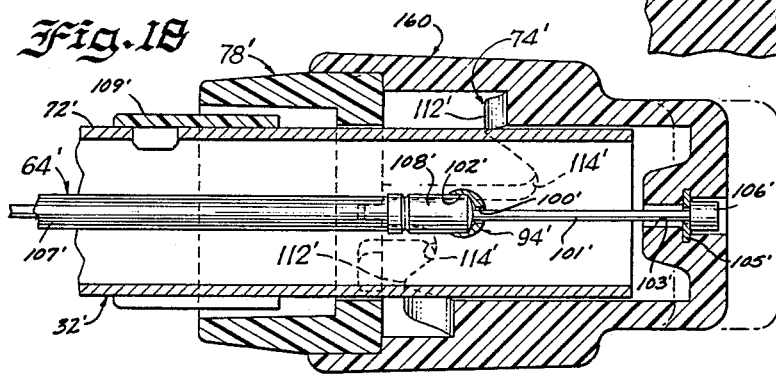

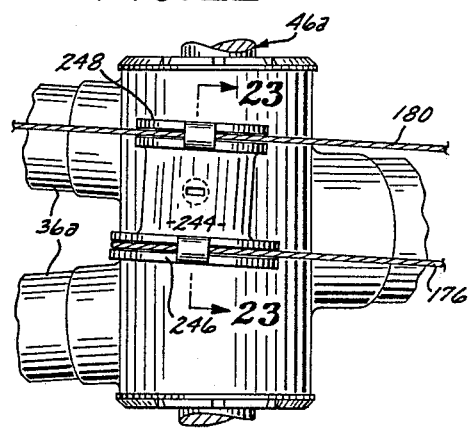
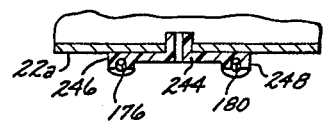
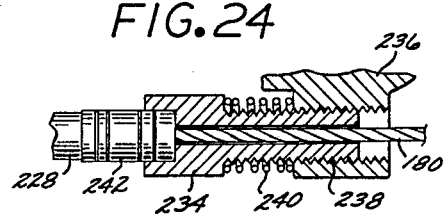
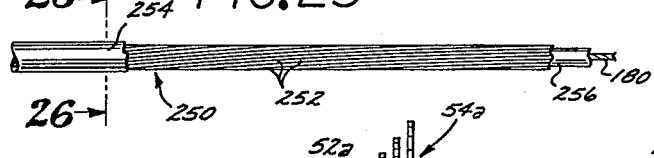
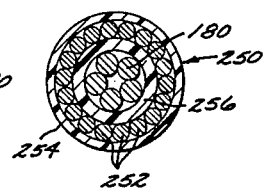
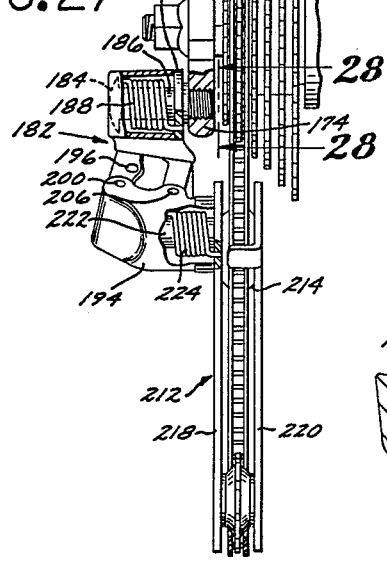
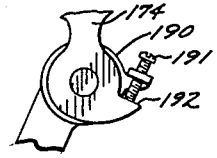
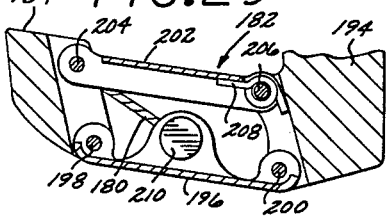

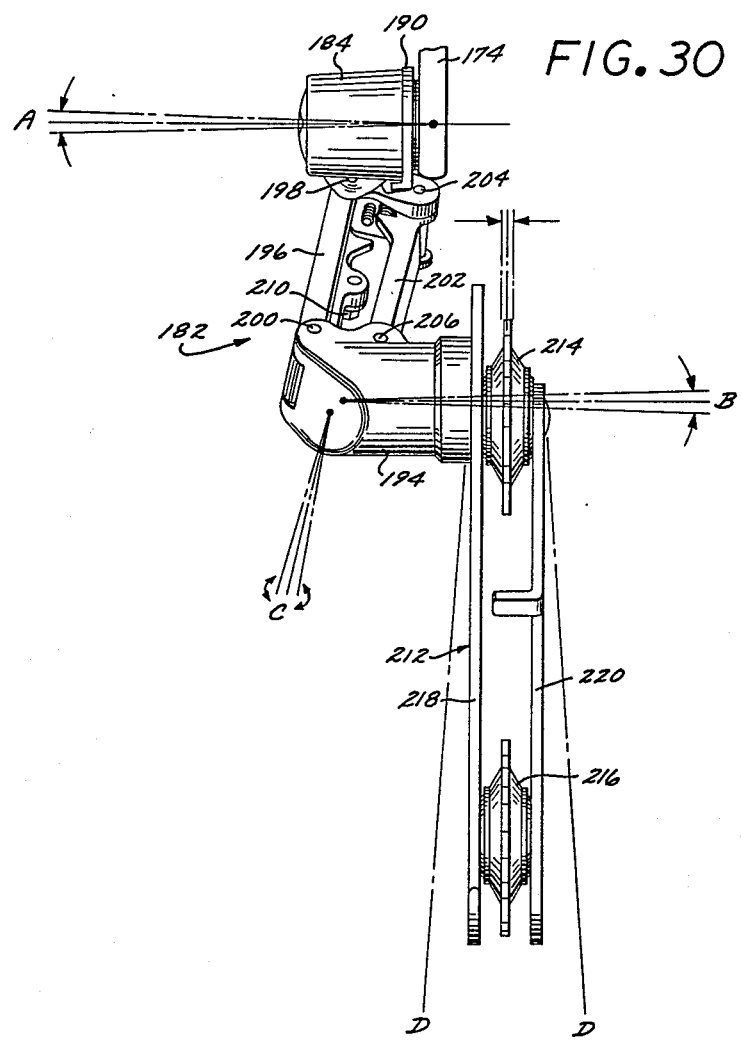

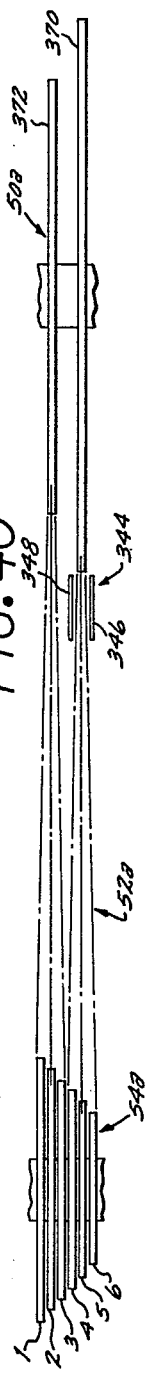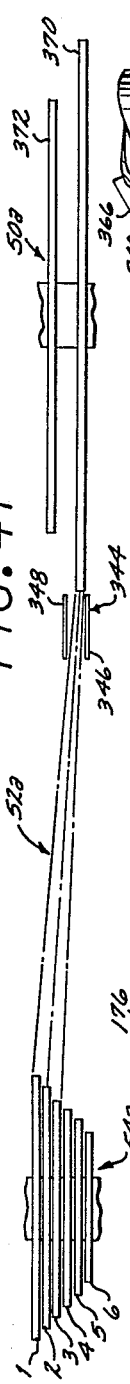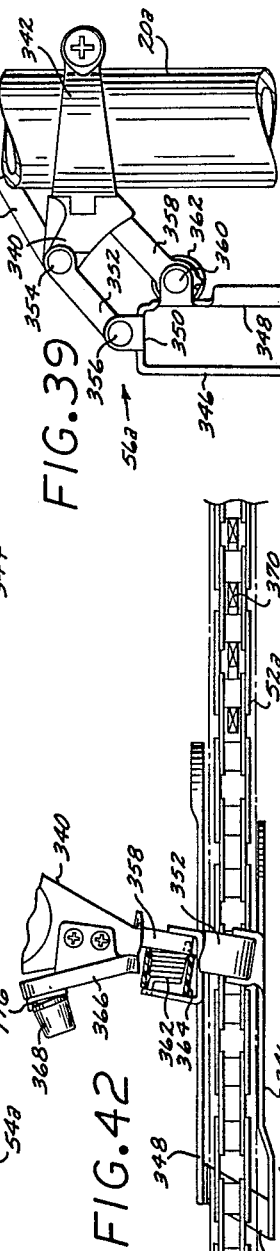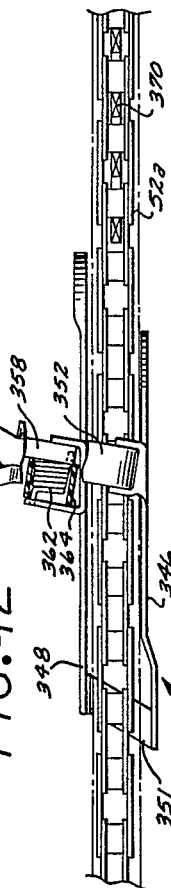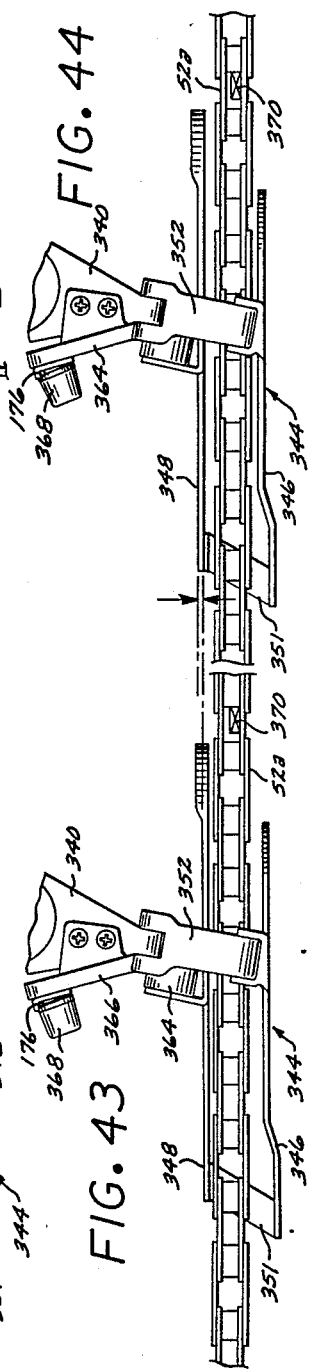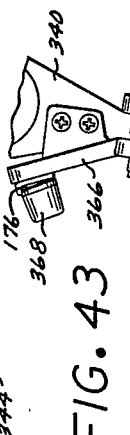

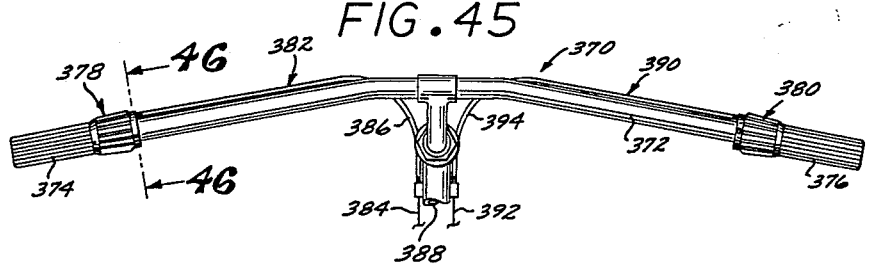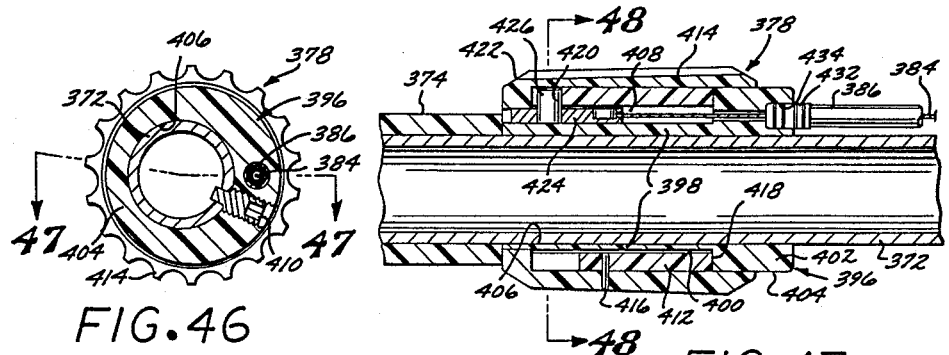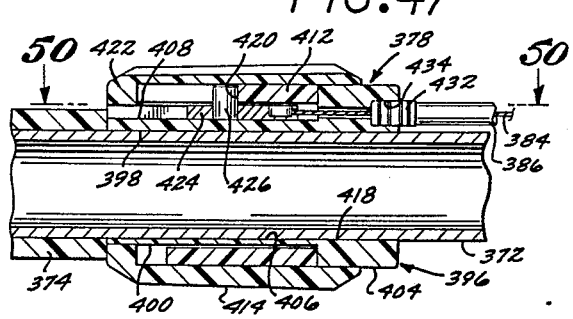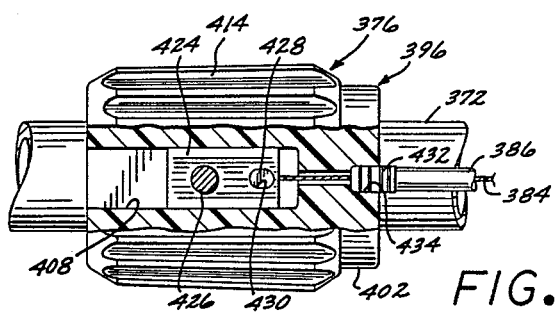

BICYCLE GEAR SHIFTING METHOD AND APPARATUS

RELATED APPLICATIONS

The present application is a continuation-in-part of application Ser. No. 291,359, filed Dec. 29, 1988, for BICYCLE GEAR SHIFTING SYSTEM, now abandoned, which in turn was a continuation of application Ser. No. 141,625, filed Jan. 6, 1988, for BICYCLE GEAR SHIFTING SYSTEM, now abandoned.

BACKGROUND OF THE INVENTION

1. Field of the Invention

The present invention relates in general to derailleur type bicycle shifting systems, and more particularly to such a system wherein front and rear derailleur mechanisms are precisely controlled by respective rotatable handgrip shift actuators.

2. Description of the Prior Art

There has been a long-felt but previously unfulfilled need in the art for a bicycle derailleur shifting system which does not require that a hand, or least a thumb, be removed from the handlebar during shifting. Many derailleur shifting devices are actuated by levers mounted on the down tube of the frame, while some are mounted on the top tube and others on the handlebar. Such levers mounted on the down tube or the top tube all require that a hand be completely removed from the handlebar during shifting. Some derailleur shifting levers mounted on the handlebar can be actuated by taking a thumb off the handlebar and pushing the lever with the thumb, but this also diminishes control of the bicycle, and is awkward, so most riders simply take their hand off the handlebar to move the shift lever. For both safety and convenience, it is desirable to be able to shift derailleur mechanisms with both hands right on the handlebars. Despite a long-felt need for such a derailleur shifting system, applicant is not aware of any prior art derailleur shifting system where the shifting events can be accomplished with both hands on the handlebar.

Typical prior art derailleur shifting mechanisms which require removal of the hand, or at least the thumb, from the handlebar are disclosed in the following U.S. patents: Ross U.S. Pat. No. 4,055,093; Hedrich U.S. Pat. No. 4,194,408; Cirami U.S. Pat. No. 4,201,095; Bonnard 4,384,864; and Strong U.S. Pat. No. 4,548,092.

There has also been a long-felt but previously unfulfilled need in the art for a bicycle derailleur shifting system which is capable of "overshifting," yet which is not undesirably complicated and expensive. Overshifting is movement of the chain beyond the destination sprocket, and then back into alignment with the destination sprocket. It has long been known in the art that such overshifting is desirable during down-shifting events for earlier and smoother shifts. Most derailleur shifting systems do not have any built-in mechanism for accomplishing such overshifting, and require that the rider deliberately move the shifting lever beyond the location of the destination sprocket and then back to the destination sprocket. This requires two rider inputs, one being a determination of the desired extent of overshift, and the other being the time duration of the overshift. Satisfactory overshifting by this means requires considerable skill.

Applicant is aware of two prior art patents which disclose bicycle derailleur shifting apparatus having a built-in overshift feature. These are Yamasaki U.S. Pat. No. 4,267,744 and Bonnard U.S. Pat. No. 4,384,864. Both of these are very complicated mechanisms. Each of these devices has a built-in determination of the amount of overshift travel, yet neither of them determines the timing of the overshift. This is left up to the rider, who must first move a lever to the overshift position, and then move the lever back to the normal shift position.

Another problem with the Yamasaki and Bonnard overshift mechanisms is that they each provide the same amount of overshift travel for each one of the sprockets of a rear derailleur freewheel. The problem with this is that in most, if not all derailleur systems, the most advantageous extent of overshift travel varies for different freewheel sprockets. The "chain gap" or chain span between the derailleur guide pulley and a freewheel sprocket is considerably larger for the smaller, higher gear freewheel sprockets than for the larger, lower gear freewheel sprockets, and a relatively long chain gap generally requires a larger amount of overshift than a relatively short chain gap for optimum shifting. Another problem with the built-in overshift features in both Yamasaki and Bonnard is that an optimum amount of overshift for the other freewheel sprockets is generally too much for the #1, lowest gear sprocket closest to the wheel. An optimum amount of overshift travel for the other freewheel sprockets is likely to cause derailling from the #1 sprocket, which could seriously damage the bicycle. Thus, since the overshift amount is the same for all sprockets, it is inherent that neither of the Yamasaki or Bonnard overshift mechanisms produces sufficient overshift travel for optimum down-shifting.

Another long-noted problem in the art which is heretofore been unsolved is the provision of an accurate front derailleur system capable of handling not only "parallel riding" but also "cross-over riding." For example, with a 2-chain wheel front derailleur system, for parallel riding the larger chain wheel will service the smaller rear freewheel sprockets, and the smaller chain wheel will service the larger freewheel sprockets. With cross-over riding, the chain may be crossed over from the larger chain wheel to relatively large freewheel sprockets, or the chain may be crossed over from the smaller chain wheel to relatively small freewheel sprockets. Such crossed-over chain locations have a propensity for causing undesirable "chain rasp," and the prior art solution to this problem was simply to provide a front derailleur chain cage having a relatively wide gap between the cage plates. While this may reduce chain rasp, it causes the further problems of inaccuracy in shifting, and frequent chain derailling.

A further problem in the art, which relates primarily to rear bicycle derailleur shifting systems, is that there are numerous points of lost motion in both the derailleur mechanism and its actuating cable which cumulatively add up to a considerable amount of overall lost motion, as for example from about 0.040 to about 0.070 inch. Applicant has found that for accurate index shifting, substantially all of this cumulative lost motion must first be taken up at the shift actuator before the actual shift increment of travel between adjacent sprockets is applied during a down-shifting event. Applicant is not aware of any specific consideration of this problem in the prior art, and in particular of any specific compensation for such cumulative lost motion for each of the various type of derailleur and cable systems currently available.

It has long been recognized in the art that rotary handgrip devices can be useful for controlling vehicle mechanisms, particularly on motorcycles, but also on bicycles. Several of such devices are disclosed in Braumandl French patent No. 829,283. However applicant is not aware of any such device having previously been employed in cooperation with derailleur bicycle shifting apparatus, and such is not taught or suggested by Braumandl.

SUMMARY OF THE INVENTION

In view of these and other problems in the art, it is a general object of the present invention to solve the problems associated with prior art bicycle derailleur shifting systems.

Another object of the invention is to provide a bicycle derailleur shifting system which embodies a shift actuator that is conveniently rotatably mounted about the handlebar and so located as to not require the rider to remove a hand, or even a thumb, from the handlebar to effect a shifting event, thereby providing improved shifting convenience and safety.

Another object of the invention is to provide a bicycle derailleur shifting system embodying a shift actuator which is particularly simple in construction and economical to manufacture, yet which, in combination with the derailleur mechanism, has improved performance over prior art derailleur shifting systems in all respects.

Another object of the invention is to provide a bicycle derailleur shifting system having a handgrip shift actuator embodying a generally helical cam which defines the derailleur mechanism movements.

Another object of the invention is to provide a bicycle derailleur shifting system which completely accounts and compensates for numerous lost motions in the derailleur mechanism and its actuating cable, thereby enabling precise index shifting to be accomplished.

A further object of the invention is to provide a bicycle derailleur shifting system wherein cable lost motion factors such as cable housing compressability and warp are minimized and made very predictable to assist in accurately determining and compensating for all cumulative lost motion factors.

Another object of the invention is to provide a bicycle derailleur shifting system in which a rotary handgrip shift actuator cooperates with the derailleur mechanism so as to enable down-shifting to be easily accomplished with substantially uniform twisting effort by the rider for down-shifting through all of the gears, despite progressively increasing derailleur return spring loading for increasingly lower gear ratios.

A further object of the invention is to provide a bicycle derailleur shifting system in which a rotary handgrip shift actuator cooperates with the derailleur mechanism in compensating for variations in chain gap length.

A further object of the invention is to provide a bicycle derailleur shifting system in which a rotary handgrip shift actuator cooperates with the derailleur mechanism in providing an optimum amount of overshift for down-shifting to each of the gears, despite variations that may be present in spacing between different rear freewheel sprockets and variations in chain gap for different freewheel sprockets.

A further object of the invention is to provide a bicycle derailleur shifting system wherein a rotary handgrip shift actuator has built-in overshift capability, yet is very simple in construction.

A further object of the invention is to provide a bicycle derailleur shifting system which has built-in overshift capability, yet does not require manual input to define all or part of the overshift actuation.

A further object of the invention is to provide a bicycle derailleur shifting system wherein a rotary handgrip shift actuator effects overshift increments an optimum amount relative to each rear derailleur freewheel sprocket for the most positive and accurate index shift events possible.

A still further object of the invention is to define optimum and preferred minimum and maximum shifting limits for rear derailleur mechanisms, and to teach how these limits may be achieved by the use of rotary cam actuator means.

A still further object of the invention is to provide a bicycle derailleur shifting system wherein a front derailleur mechanism is actuated by a rotary handgrip shift actuator capable of fine-tuning the shift positions to accommodate cross-over riding.

Another object of the invention is to provide a bicycle derailleur shifting system having built-in overshift, wherein the overshift timing is automatically established by the natural shifting movement, and does not require separate rider input.

Another object of the invention is to provide a bicycle derailleur shifting system having a handgrip shift actuator rotatably mounted over the end of a handlebar.

Yet a further object of the invention is to provide a bicycle derailleur shifting system having a handgrip shift actuator rotatably mounted on a handlebar inboard of the handlebar end.

According to the invention, a bicycle equipped with front and rear derailleurs has front and rear handgrip shift actuators rotatably mounted over the handlebar, the front handgrip shift actuator being operatively associated with the front derailleur mechanism for shifting the front derailleur, and the rear shift actuator being operatively associated with the rear derailleur mechanism for shifting the rear derailleur. The rear handgrip shift actuator is preferably mounted on the right side of the handlebar and the front front handgrip shift actuator mounted on the left side of the handlebar to accommodate most riders, since the rear derailleur is shifted more frequently than the front derailleur. Each handgrip shift actuator contains a generally cylindrical cam member having a generally helical operating face configured with a plurality of spaced detents or valleys with a cam peak or lobe between each pair of adjacent detents. A housing covers and is keyed to the cam member. Thus, a front handgrip actuator which cooperates with a front derailleur having two chain rings will have two primary detents and one intervening peak. Similarly, a rear handgrip shift actuator for cooperation with a rear derailleur having a 6-sprocket freewheel will have a cam operating face with six successive detents and five intervening peaks.

One form of handgrip shift actuator according to the invention is conveniently mounted over an end of the handlebar, as for example over an end of a traditional drop bar-type handlebar. In this type of handgrip shift actuator, the cam operating face faces inwardly away from the handlebar end, and engages a cam pin which is rigidly diametrically affixed to the handlebar with an operating end projecting outwardly from the handlebar. The derailleur actuating cable and cable jacket enter the inside of the handlebar through a suitable opening, and the cable passes through a hole in the pin and thence through a generally flat outer end portion of the cam member, with an enlargement crimped or cast on the end of the cable which bears against an outwardly facing surface on the end portion of the cam member. The cable jacket terminates in a counterbore of the pin hole. The other end of the cable is attached to the parallelogram of the derailleur mechanism and the cable is tensioned by the derailleur return spring associated with the parallelogram. Rotation of the handgrip actuator in one direction causes the cam face to ride upwardly, i.e., outwardly relative to the handlebar end, so as to pull the cable in down-shifting increments from detent to detent on the cam face. Rotation of the handgrip actuator in the opposite direction releases cable tension causing the derailleur mechanism to up-shift from detent to detent on the cam face.

Another form of handgrip shift actuator according to the invention which is particularly suitable for mountain bikes is mounted over the handlebar inboard of the handlebar end so as to leave room for a fixed handgrip proximate the end of the handlebar. In this form of grip shift actuator, a tubular support body is slipped over the outside of the handlebar and keyed to the handlebar. A cam follower plate slides in a slot in the tubular support body, and supports a cam follower pin. The generally cylindrical cam member is rotatably mounted over the support body, but does not move axially relative to the support body and handlebar; instead, the generally helical cam operating face, which faces outwardly toward the handlebar end, engages the cam follower pin and causes the pin and its plate to shift generally axially relative to the shift actuator and handlebar according to the cam face configuration. The derailleur actuator cable is connected to the cam follower, biasing the follower against the cam operating face because of tension on the cable from the derailleur mechanism return spring. The cable jacket end seats in a recess in the actuator support body. A generally cylindrical housing encompasses the cam member and a portion of the support body, being keyed to the cam member but being rotatable relative to the support body. Rotation of the housing and cam member in one direction will cause the cam follower to ride upwardly on the cam operating face or toward the end of the handlebar, pulling the cable in successive down-shifting increments from detent to detent along the cam face, and rotation of the actuator in the opposite direction will cause the cam follower to release the cable in up-shifting increments from detent to detent along the cam face.

An important aspect of the present invention is the coaction between the rotary handgrip shift actuator and any one of a number of different derailleur systems. Each of the various derailleur systems has its own special operating characteristics which must be accounted for in a handgrip cam of the invention, these characteristics including a variety of lost motions in both the derailleur mechanism and its cable system, varying chain gap for the different freewheel sprockets, varying spacings between the freewheel sprockets, derailleur return spring force and the rate of variation of that force as the derailleur mechanism shifts the chain either downwardly toward larger freewheel sprockets or upwardly toward smaller freewheel sprockets, and the like. Applicant preferably provides a special handgrip cam with a cam face specially configured to account and/or compensate for all of these special characteristics of any particular derailleur system, to the end that each shift from one freewheel sprocket to another is an early, positive, and accurately aligned index shift. Thus, applicant's rear shift actuator cam cooperates with the rear derailleur system in compensating for the sum of all of the lost motions in the derailleur system and its cable system, in compensating for variations in chain gap length, and in providing an optimum amount of overshift for down-shifting to each of the gears. The operating characteristics of front derailleur mechanisms are similarly accounted and compensated for.

Built-in overshift is programmed on applicant's handgrip shift actuator cams so as to provide optimum overshift for each down-shift event. Such overshift does not require separate manual input for the timing of the overshift; the natural rotational movement of the handlebar shift actuator automatically times the overshift.

Another important part of the invention is the definition of optimum and preferred minimum and maximum shifting limits for rear derailleur mechanisms, and the programming of the cam operating faces of the handgrip shift actuators of the invention to accurately achieve such shifting limits for each available derailleur system.

The front handgrip shift actuator cam has respective primary detents for chain alignment with each front derailleur chain wheel. A form of the front actuator cam also embodies secondary, fine-tune detents to fine-tune the chain alignment for accommodation of crossover riding. This allows a relatively narrow chain cage to be employed, for accurate shifting and for avoidance of chain derailling.

BRIEF DESCRIPTION OF THE DRAWINGS

These and other objects of the invention will become more apparent in reference to the following description and the accompany drawings, wherein:

FIG. 5 is a cross-sectional view taken on the line 5—5 in FIG. 3;

FIG. 6 is a cross-sectional view taken on the line 6—6 in FIG. 3;

FIG. 7 is a plan sectional view taken on the line 7—7 in FIG. 5;

FIG. 8 is a developed view indicated at line 8—8 in FIG. 4 illustrating one cam profile of the present invention;

FIG. 9 is a cross-sectional view taken on the line 9—9 in FIG. 5;

FIG. 10 is an exploded, perspective view of a handgrip shift actuator according to the invention;

FIG. 11 is an exploded, perspective view illustrating installation of a handgrip shift actuator according to the invention;

FIG. 12 is a cross-sectional view taken on the line 12—12 in FIG. 2 showing a front handgrip shift actuator of the invention;

FIG. 13 is a developed view indicated at line 13—13 in FIG. 12 illustrating a simple 2-position cam profile for the front shift actuator;

FIG. 14 is a cross-sectional view similar to FIG. 12 showing an alternative cam having fine-tune detents;

FIG. 15 is a developed view indicated at line 15—15 in FIG. 14 illustrating the cam profile;

FIG. 16 a is cross-sectional view similar to FIG. 4 illustrating an alternative embodiment with the cam and cam housing combined;

FIG. 17 is a cross-sectional view taken on the line 17—17 of FIG. 16;

FIG. 18 is a cross-sectional view taken on the line 18—18 in FIG. 16;

FIG. 19 is a developed view indicated at line 19—19 in FIG. 16 illustrating another cam profile;

FIG. 22 is a further enlarged, fragmentary view taken on the line 22—22 in FIG. 20;

FIG. 23 is a fragmentary view taken on the line 23—23 in FIG. 22;

FIG. 24 is a fragmentary view, partly in section and partly in elevation, taken on the line 24—24 in FIG. 21;

FIG. 25 is an elevational view with portions broken away taken on the line 25—25 in FIG. 21;

FIG. 26 is a cross-sectional view taken on the line 26—26 in FIG. 25;

FIG. 27 is a fragmentary elevational view, with portions broken away, taken on the line 27—27 in FIG. 21;

FIG. 28 is an enlarged fragmentary elevational view illustrating an adjustment feature of the rear derailleur mechanism of FIG. 21;

FIG. 29 is a fragmentary sectional view taken on the line 29—29 in FIG. 21;

FIG. 30 is a perspective view of a portion of the derailleur mechanism shown in FIG. 21 indicating various points of lost motion;

FIG. 39 is a fragmentary elevational view of a front derailleur mechanism;

FIG. 40 is a diagrammatic view illustrating parallel riding;

FIG. 41 is a diagrammatic view illustrating cross-over riding;

FIG. 42 is a fragmentary plan view illustrating parallel riding;

FIG. 43 is a view similar to FIG. 42 illustrating cross-over riding;

FIG. 44 is a view similar to FIGS. 42 and 43 illustrating correction of the cross-over of FIG. 43 by means of a fine-tune cam detent;

FIG. 45 is a fragmentary elevational view of the front end of the mountain bike;

FIG. 46 is a cross-sectional view taken on line 46—46 in FIG. 5;

FIG. 47 is a fragmentary longitudinal sectional view taken on the line 47—47 in FIG. 46;

FIG. 48 is a cross-sectional view taken on the line 48—48 in FIG. 47;

FIG. 49 is a view similar to FIG. 47, but with the cam rotated to a different position; and FIG. 5 is a view taken on the line 50—50 in FIG. 49.

DETAILED DESCRIPTION

Figure 1:
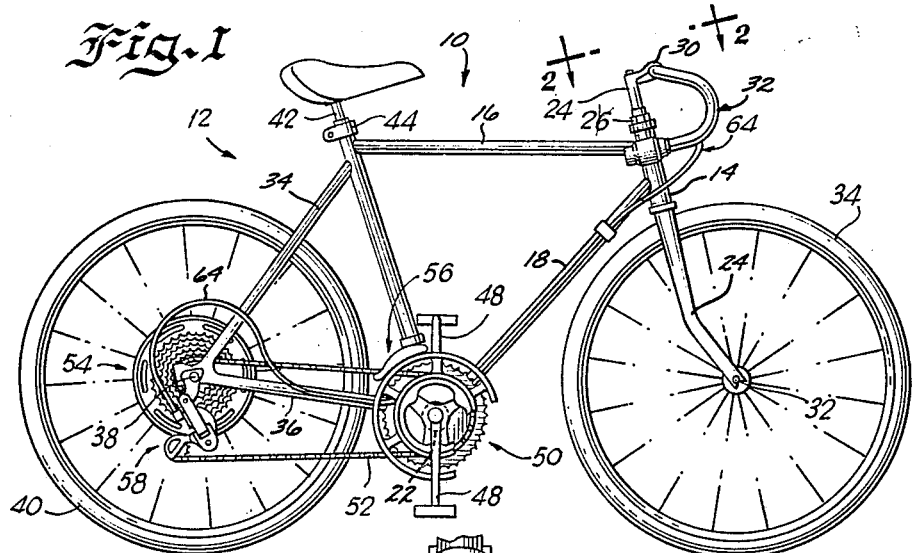
FIG. 1 is an elevational view of a bicycle embodying the present invention.
Figure 2:
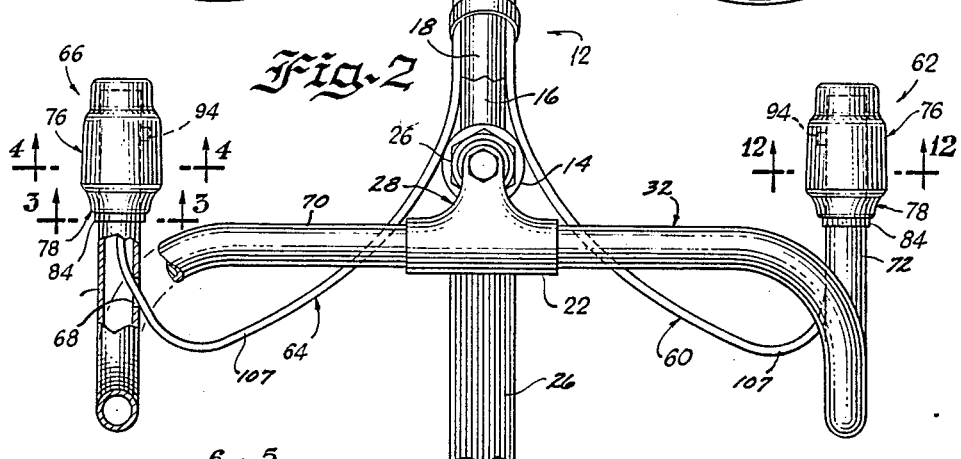
FIG. 2 is a plan view partially broken away along the line 2—2 in FIG. 1.
Figure 3:
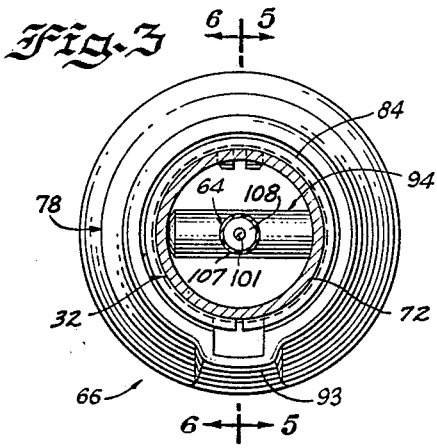
FIG. 3 is a cross-sectional view taken on the line 3—3 in FIG. 2.
Figure 4:
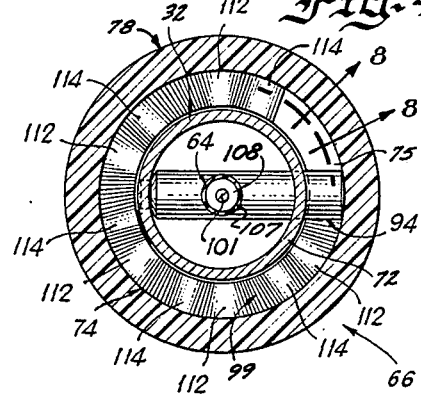
FIG. 4 is a cross-sectional view taken the line 4—4 in FIG. 2.

FIGS. 1 and 2 illustrate a 12-speed bicycle, generally designated 10, in which a 6-sprocket rear derailleur mechanism is actuated by a rear handgrip shift actuator according to the invention, and a 2-chain wheel front derailleur mechanism is actuated by a front handgrip shift actuator according to the invention. It is to be understood, however, that the principles of the present invention are equally applicable to any multi-speed bicycle embodying derailleur-type shifting, including three, five, six, seven, ten, twelve, fourteen, and eighteen-speed bicycles, and the like. Bicycle 10 has a primary frame which is generally triangle-shaped, including a head tube 14, a generally horizontal top tube 16 connected at its front end to head tube 14, a main down tube 18 extending downwardly and rearwardly from head tube 14, and a seat tube 20 connected to the rear end of top tube 16 and extending downwardly and forwardly therefrom. Main down tube 18 and seat tube 20 are joined at their lower ends to bottom bracket 22, shown in phantom, within which the pedal crank is horizontally journalled.

A front fork 24 defines the axis 26 of front wheel 27. A steering tube (not shown) at the upper end of front fork 24 extends upwardly into head tube 14, and is wedge-clamped to a handlebar stem generally designated 28 which extends down into the steering tube within head tube 14. Handlebar stem 28 includes a handle bar clamp 30 at its upper end for gripping handlebar 32. The handlebar 32 which is illustrated in FIGS. 1 and 2 is of the traditional drop bar type, although it is to be understood that the invention is equally applicable to any type of bicycle handlebar.

A down fork 34 consisting of left and right seat stays extends downwardly and rearwardly from the upper portion of seat tube 20, and a bottom fork 36 consisting of left and right chain stays extends rearwardly from bottom bracket 22. The left sides of down fork 34 and bottom fork 36 are connected at their rear ends, and similarly the right sides of down fork 34 and bottom fork 36 are connected at their rear ends, and these rear end connections support rear wheel dropouts which define the axis 38 of rear wheel 40.

Seat stem 42 is engaged in the upper end of seat tube 0 and is releaseably secured by seat clamp 44. The pedal crank, generally designated 46, is rotatably journalled in bottom bracket 22, and includes right and left crank arms 48. A chain wheel cluster generally designated 50 is rigidly supported on pedal crank 46, and constitutes the sprocket cluster of the front derailleur assembly. Most commonly, the chain wheel cluster will embody two chain wheels, although it is also common to have chain wheel clusters with three chain wheels. The front handgrip shift actuator shown in FIGS. 2, 12, and 13, and the front handgrip shift actuator shown in FIGS. 14 and 15, are both adapted for utilization with a chain wheel cluster 50 embodying two chain wheels. An endless drive chain 52 transmits power from the chain wheel cluster 50 to a multiple freewheel 54 that is operatively connected to the rear wheel hub mechanism in a conventional manner.

A front derailleur mechanism generally designated 56 cooperates with chain wheel cluster 50 to shift chain 52 laterally between the two chain wheels of cluster 50, down-shifting from the smaller chain wheel to the larger chain wheel, or up-shifting from the larger chain wheel to the smaller chain wheel. A rear derailleur mechanism 58 is pivotally connected to the frame proximate the confluence of the right side portions of down fork 34 and bottom fork 36 for shifting chain 52 laterally from sprocket to sprocket of the multiple freewheel 54, either down-shifting from a smaller sprocket to a larger sprocket or up-shifting from a larger sprocket to a smaller sprocket. A front control cable 60 operatively connects a front handgrip shift actuator 62 to the front derailleur mechanism 56 such that the front handgrip shift actuator 62 cooperates with and controls the shifting of front derailleur mechanism 56. Similarly, a rear control cable 64 operatively connects a rear handgrip shift actuator 66 to the rear derailleur mechanism 56 such that the rear handgrip shift actuator 66 cooperates with and controls the shifting of the rear derailleur mechanism 58.

The handgrip shift actuators of the invention illustrated in FIGS. 1-19 are all adapted for mounting over the ends of the bicycle handlebar 32, with each of the respective cables 60 and 64 being operatively connected to the respective shift actuators 62 and 66 through respective end portions of handlebar 32. Accordingly, each of the cables 60 and 64 is threaded through a respective aperture 68 in the wall of handlebar 32 from the outside to the inside of the wall of handlebar 32 for coupling with the respective shift actuators 62 and 66.

The traditional drop bar-type handlebar 32 shown in FIGS. 1 and 2 consists of a generally straight transverse portion 70 with down-turned U-shape side portions having generally straight rearwardly directed end portions 72 over which handgrip shift actuators 62 and 66 of the invention are mounted. In the normal operation of a bicycle equipped with both front and rear derailleurs, the rear derailleur mechanism is shifted more frequently than the front derailleur mechanism. Accordingly, as a convenience to most riders, rear shift actuator 66 is preferably mounted on the right-hand end portion 72 of the handle bar, and front shift actuator 62 is mounted on the left-hand end portion 72 of the handlebar.

During cycling while not shifting, a cyclist will normally grip the lower, end portions 72 of handlebar 32 forward of the handgrip shift actuators 62 and 66. Since shift actuators 62 and 66 occupy a portion of the normal grip space on the handle bar end portions 72, it is preferable to provide a handlebar 32 which has end portions 72 somewhat longer than those found on a conventional drop bar-type handlebar.

Rear handgrip shift actuator 66 will next be described in detail in connection with FIGS. 3-11. A rotary cam member 74 having a generally helical operating face is the heart of the rear handgrip shift actuator 66 and cooperates with the rear derailleur mechanism 58 for positive, smooth, and easy shifting in both the down-shift direction and the up-shift direction. There are currently approximately ten different derailleur mechanisms available on the market, and each one has different shifting characteristics, both in general for down-shifting and up-shifting through all of the rear gears, and specifically for down-shifting and up-shifting in each individual gear. For positive index shifting of each type of rear derailleur currently available, it is preferred to have a cam member 74 the operating face of which is specifically contoured to cooperate with that type derailleur for positive index down-shifting and up-shifting to each gear. Accordingly, for the approximately ten different rear derailleur mechanisms available, it is preferred to have approximately ten respective differently contoured cam members 74 of the invention. Nevertheless, because of the way rear handgrip shift actuator 66 is constructed, all of the other parts of shift actuator 66 may be the same for the various types of rear derailleur mechanisms.

Similarly, the approximately ten different front derailleur mechanisms currently available also have different operating characteristics, and for positive and easy front derailleur index shifting it is preferred to have a separate cam contoured for cooperation with each different front derailleur mechanism, one type cam for the front handgrip shift actuator 62 being shown in FIGS. 12 and 13, and another type cam for the front shift actuator 62 being shown in FIGS. 14 and 15.

As described in detail hereinafter, the close cooperation between front and rear shift actuators 62 and 66 and respective front and rear derailleur mechanisms 56 and 58 is such that the present invention resides in the combination of a handgrip shift actuator 62 or 66 and a respective derailleur mechanism 56 or 58. This is borne out by the fact that for uniform, easy, positive index shifting, the cam member of the respective front or rear shift actuator 62 or 66 is preferably constructed to accommodate the peculiar characteristics of any particular front or rear derailleur mechanism, such as chain gap variations through the gears, actuation ratios through the gears, return spring strength and variations through the gears, takeup for lost motion in the cable system, derailleur pivots, guide pulley and the like, and fine-tune front shift actuator locations are provided to accommodate chain cross-over between front and rear derailleur sprockets without chain rasp in the front derailleur cage.

FIGS. 3-11 illustrate the details of construction of the rear handgrip shift actuator 66. The primary operative member in shift actuator 66 is a generally cup-shaped cam member 74 having a generally cylindrical cam portion 75 that is arranged coaxially of the respective handlebar end portions 72, and a generally flat outer end portion 76 which is transverse to the axis of handlebar end portion 72. The generally cylindrical portion 75 of cam member 74 terminates inwardly at an inner end 77 which is also transverse to the axis of handlebar end portion 72.

Cam member 74 nests within a generally complementary cam cover member 78 which has a generally cylindrical barrel portion 79 that overlies the cam portion 75, and a generally flat, transverse end portion 80 that overlies the cam portion 76. The generally cylindrical portions 75 and 79 of the respective cam and cover members 74 and 78 are preferably of stepped configuration as illustrated, the inner part of the cylindrical cam portion 75 being radially thickened to provide a relatively wide cam operating surface and increased hand torquing radius, and the inner part of the cover barrel portion 79 being thickened for further hand torquing radius. After cam member 74 has been assembled within cover member 78, a cover bushing 82 is mounted on the inner end of cover member 78, bushing 82 having a skirt portion 84 which is engaged within cover member 78. Bushing 82 is permanently bonded to cover member 78, preferably by ultrasonic welding, or alternatively by adhesive means.

Cam member 74 is preferably molded from a high-strength, chemically lubricated plastic material such as Delrin 500CL that provides a durable and lubricious cam operating face, as well as freedom of rotation of cam member 74 about the handlebar end portion 72. Cover member 78 and its bushing 82 are preferably molded from a plastic material such as ABS which has high resistance to ultraviolet light penetration and will therefore protect cam member 74 from ultraviolet deterioration.

Cam member 74, cover member 78, and bushing 82 are registered such that all three members rotate together. Two registration systems are provided, one registering cam member 74 to cover member 78, and the other registering bushing 82 to cover member 78. FIG. 10 best illustrates these two registration systems.

The registration of bushing 82 to cover member 78 includes a generally axially directed external key 86 on bushing skirt 84, key 86 being received in a complementary generally axially directed keyway recess 88 in the cover barrel portion 79.

The registration system between cover member 78 and cam member 74 consists of one or more generally radially directed slots formed in the outside of cam end portion 76, and a similar number of registering, generally radially directed ribs projecting from the inside of the cam cover end portion 80. In the embodiment illustrated in FIGS. 3-11, there are three of such slots 90 and ribs 92, and these are irregularly spaced about the center axes of cam member 74 and cover member 78 so that the cam and cover members 74 and 78, respectively, can only be assembled in one position of relative rotation. This is so that a tactile sensor 93 on the outside of cover bushing 82 will also have a single, fixed rotational position relative to cam member 74, so as to provide an indication to the cyclist of the particular gear which is engaged. The tactile sensor 93 is best seen in FIGS. 5 and 11, being shown in the six o'clock position in FIG. 5. For convenience in molding, the tactile sensor 93 is axially aligned with bushing key 86. As handgrip shift actuator 66 is rotated to shift the derailleur mechanism from gear to gear, sensor 93 rotates an equivalent amount, thus providing the cyclist with a tactile indication of the selected gear ratio.

The operating surface of cam member 74 engages and rides over a cam pin 94 which is fixedly attached to the handlebar end portion 72. As seen in FIGS. 3, 4, 7 and 11, cam pin 94 is generally cylindrical in shape and has a reduced diameter portion 95 at one end. Cam pin 94 is mounted in the handlebar end portion 72 with its reduced diameter portion 95 located in an aperture 97 through the wall of handlebar portion 72 so as not to extend beyond the outer surface of handlebar portion 72. Cam pin 94 extends diametrically across the inside of handlebar portion 72, projecting outwardly through a larger aperture 97 in the wall of handlebar portion 72, with a cam-operating end portion 98 of cam pin 94 extending radially outwardly from the outer surface of handlebar portion 72 to provide a fixed, smooth, rounded bearing member against which the cam operating face or surface 99 of cam member 74 rides.

Cam pin 94 serves two functions. First, its external portion 98 provides the aforesaid bearing surface which is engaged by cam operating face 99. Second, cam pin 94 provides a locater for the end of the cable housing or casing. A bore 100 is provided diametrically through cam pin 94 at a location radially centered within the handlebar portion 72 and axially aligned with handlebar portion 72. The rear derailleur shifting cable 101 passes through this bore 100. A counterbore 102 of bore 100 presents a shoulder that faces inwardly of the handlebar end. Registering center apertures 103 and 104 extend through the cam and cover member ends 76 and 80, respectively, and an annular bearing plate 105 is moulded into the cam member end 76 so as to present a metal bearing surface in a direction outwardly of the handlebar end. After cable 101 extends through cam pin bore 100, it passes through the cam member end bore 103 and bearing plate 105, and terminates at either a crimped collar or cast-on metal bead 106, which may be made of lead. The housing or casing 107 for cable 101 has a ferrule 108 crimped over its end, and ferrule 108 seats within the cam pin counterbore 102, thus providing a fixed location for cable housing 107 relative to cable 101.

The return spring of rear derailleur mechanism 58 constantly tensions the cable 101, which in turn constantly biases the cam operating face 99 against the cam pin operating end 98. When cable 101 is pulled outwardly by cam operating surface 99 relative to the handlebar end, the other end of cable 101 will actuate rear derailleur mechanism 58 in a down-shift movement to a larger freewheel sprocket closer to the wheel 40; while release of cable 101 by cam operating face 99 will allow the return spring of rear derailleur mechanism 58 to pull cable 101 toward the derailleur mechanism 58 and cause derailleur mechanism 58 to up-shift the chain away from wheel 40 to a smaller sprocket. The generally helical, stepped operating face 99 of cam member 74 is preferably arranged to move axially outwardly of the handlebar end when twisted clockwise as viewed by a cyclist, thereby pulling cable 101 outwardly and shifting rear derailleur mechanism 58 to a larger sprocket and larger gear ratio. Conversely, when cam member 74 is twisted counterclockwise by the cyclist, derailleur return spring tension on cable 101 will cause cam member 74 to move inwardly of the handlebar end, allowing derailleur mechanism 58 to shift upwardly to a smaller sprocket.

Preferably, a portion of cover bushing 82 overlies a collar fixedly mounted on the handlebar end portion 72, such that bushing 82 and collar 109 cooperate as a baffle to minimize entry of dust into the shift actuator mechanism, which might otherwise cause premature wear in the mechanism. Collar 109 has a locator button 110 thereon which seats in a handle bar hole 111 to fixedly position collar 109 on handlebar end portion 72.

FIG. 8 illustrates the profile of operating face or surface 99 of cam member 74, laid out flat for convenience in understanding. Cam operating face 99 consists of a series of peaks or crests 112 and intermediate detent valleys 114. The operating face 99 has six detents and five intermediate peaks, to serve a 6-sprocket rear derailleur freewheel as seen in FIG. 1. As seen in FIG. 8, the rear shift actuator 66 is twisted all of the way to its highest gear, smallest sprocket position, with cam pin 94 located in the uppermost, first detent 114. As shift actuator 66 is rotated from the position of FIG. 8, a first cam ramp 115 rides upwardly against cam pin 94, and the first peak 112 rides over pin 94 so that the pin then becomes located in the second detent 114. At the first detent position, which is shown, the rear derailleur mechanism 58 substantially aligns chain 52 with sprocket #6, which is the smallest sprocket of freewheel 54. At the second detent 114, rear derailleur mechanism 58 substantially aligns chain 52 with sprocket #5, which is the second smallest sprocket of freewheel 54. As rear shift actuator 66 is progressively rotated to move the cam operating surface 99 upwardly as viewed in FIG. 8, successive detents 114 engage over pin 94 to substantially align chain 52 with successively larger freewheel sprockets for successively lower gear ratios until pin 94 is lodged in the lowermost detent 114 as viewed in FIG. 8, in which location the rear derailleur mechanism 58 has moved chain 52 substantially into alignment with sprocket #1 of freewheel 54, which is the lowest gear ratio.

As rear shift actuator 66 is thus shifted from the smallest, highest gear freewheel sprocket position as shown in FIG. 8 to successively larger, lower gear freewheel sprockets, it pulls cable 101 against the return spring of rear derailleur mechanism 58 outwardly relative to the handlebar end portion 72, to the left as viewed in FIGS. 5, 7 and 8, and to the right as viewed in FIG. 6. As rear shift actuator 66 is rotated the other way to shift upwardly from the largest freewheel sprocket in which the lowermost detent 114 of FIG. 8 is engaged over cam pin 94 towards successively smaller and higher gear freewheel sprockets, the return spring of rear derailleur mechanism 58 draws cam member 74, together with its cover member 78 and bushing 82, incrementally to the right as viewed in FIGS. 5, 7 and 8, and to the left as viewed in FIG. 6. The position illustrated in FIGS. 5–8 are the smallest freewheel sprocket, highest gear ratio position, while the phantom line position illustrated in FIGS. 5 and 6 represents the largest freewheel sprocket, lowest gear ratio position. In all axial positions of cam member 74, bushing 82 will overlie handlebar collar 109 to serve the function of inhibiting entry of dust or dirt into the shift actuator mechanism.

Each of the cam face detent valleys 114 serves two functions. First, it serves to axially locate cam member 74 relative to handlebar end portion 72, and hence correspondingly axially locate cable 101, and thereby position derailleur mechanism 58 for alignment of drive chain 52 with a respective sprocket of freewheel 54. Each of the cam face detent valleys 114 also serves as a detent for positively rotationally locating, and hence indexing, cam member 74 relative to the handlebar end portion 72, thereby effecting positive index shifting. Nevertheless, both the cam ramp slopes 115 and the back slopes 116 of cam operating face 99 are gentle enough slopes so that, together with the rounding of peaks 112, both down-shifting and up-shifting are effected easily and smoothly.

As will be described in detail hereinafter in connection with detailed illustrations of a derailleur mechanism and associated cable actuation system, according to the present invention for the down-shift direction of rotation of cam member 74 toward larger freewheel sprockets, the heights of the cam face peaks 112 above the preceding detents 114 are calculated to first take out all lost motion in the derailleur mechanism and in the cable system, next actuate the derailleur mechanism a shift increment of movement in which the chain is brought into alignment with the next larger sprocket, and then further actuate the derailleur mechanism in an overshift increment of movement. Then, as cam member 74 completes such down-shift to the next higher detent 114, there is first a backlash in which the lost motion originally taken up is released, and then the overshift increment is released. By this means, both the derailleur mechanism and the cable move in the up-shift direction at the completion of each down-shifting event. This restores all of the lost motion locations in both the derailleur mechanism and the cable system at the end of a down-shifting event to exactly their same positions as if an up-shift to a smaller sprocket had been effected, and it also places the cable friction direction the same as for an up-shifting event, whereby the same precise derailleur positioning, and hence cable locating, will occur at any freewheel sprocket destination, whether that destination was arrived at after an up-shift or a down-shift.

As noted above, the specific profile of cam operating face or surface 99 is determined by the operating characteristics of the specific derailleur mechanism with which it is used. The profile of cam operating face or surface 99 illustrated in FIG. 8 is adapted for use in cooperation with a Shimano Model No. RD-7401 derailleur.

As best illustrated in FIG. 8, a stop projection 117 is provided adjacent the lowest gear detent 114. This is for the purpose of blocking further rotation of shift actuator 66 and thereby avoiding the possibility of cam face 99 riding off pin 94 and jumping to the highest gear detent 114. As also best seen in FIG. 8, a notch or cutout 118 is provided in the inner edge of bushing 82. This is to provide clearance for cam pin 94 as cam member 74 is shifted from the next lowest gear detent 114 to the lowest gear detent 114.

The detent function of cam surface detent valleys 114 provides for self-locking of cam member 74 at each gear position without reducing the ease of operation of handgrip shift actuator 66. For example, in some known index shifting systems which include a detent mechanism comprised of a ball and slip plate, the locking feature is added to the system by increasing the tension between the ball and slip plate, which makes the shifting mechanism relatively difficult to operate. In the present invention, the self-locking feature does not require any increased tension on any of the component parts of the system, thereby providing self-locking without reducing the ease of operation of shift actuator 66.

FIGS. 12 and 13 illustrate one form of front handgrip shift actuator 62 which employs a two-position cam member, generally designated 120. The front shift actuator 62 with cam member 120 cooperates with and controls the front derailleur mechanism 56 for shifting between the two chain wheels of a 2-chain wheel front sprocket cluster 50. The front handgrip shift actuator 62 is similar to the rear handgrip shift actuator 66 heretofore described, except for the profile of operating face or surface 122 of cam 120. FIG. 13 is a view in which the cylindrical cam member 120 has been opened out to a flat plan for ease of understanding, but in FIG. 13 cam operating surface 122 is shown facing generally opposite the direction in which cam operating face 99 is shown in FIG. 8.

Cam operating face or surface 122 has a first detent valley 124 for the smaller, higher gear ratio chain wheel of cluster 50, and a second detent valley 126 for the larger, lower gear chain wheel of cluster 50. Cam operating face 122 has a single rounded peak 128 between the two detents 124 and 126, with a cam ramp 130 extending between small chain wheel detent 124 and peak 128, and backslope 131 being disposed between peak 128 and large chain wheel detent 126. Cam stop surfaces 132 and 134 are provided adjacent the respective detents 124 and 126 to prevent inadvertent over-actuation of front shift actuator 62.

Cam 120 of FIG. 13 may, if desired, be modified to accommodate a derailleur system having a 3-chain wheel cluster, such as the Shimano Hyperglide derailleur system. This can be done by embodying three successive detents with two intervening peaks, instead of the two detents 124 and 126 and single intervening peak 128.

The profile of cam operating face 122 will vary according to the particular derailleur mechanism with which it is utilized. As with rear shift actuator 66, front shift actuator 62 cooperates in its mode of operation with the particular front derailleur mechanism 58 for which it is constructed, through the front control cable 60, and it is this overall combination which constitutes the front derailleur aspect of the present invention. Front handgrip shift actuator 62 provides positive index shifting of front derailleur mechanism 56 in substantially the same manner as rear handgrip shift actuator 66 provides positive index shifting of rear derailleur mechanism 58.

FIGS. 14 and 15 illustrate an alternative front handgrip shift actuator 62' having a cam member 136 with an operating face 138 that has two primary detents 140 and 142 separated by a primary cam peak 144 and cam ramp 146. Primary detent 140 is for the smaller, higher gear ratio chain wheel of cluster 50, and primary detent 142 is for the larger chain wheel of cluster 50 for "parallel riding"; i.e., the primary detents 140 and 142 are the parallel riding positions of cam 136. Parallel riding positions are when the smaller chain wheel is driving the larger sprockets of the rear multiple freewheel 54, or the larger chain wheel of cluster 50 is driving the smaller sprockets of multiple freewheel 54.

There is a propensity for chain 52 to rasp against the side plates of the front derailleur cage when the rider is "riding cross-over," i.e., when the smaller chain wheel of cluster 50 is driving the smaller sprockets of multiple freewheel 54, or when the larger chain wheel of cluster 50 is driving the larger sprockets of multiple freewheel 54. The conventional means for avoiding such rasping is by providing an undesirably wide front derailleur cage, which tends to result in inaccurate and undesirably difficult shifting between the two chain wheels of cluster 50 and leads to frequent derailling. Cam member 136 completely solves this problem and enables a relatively narrow and therefore accurate front derailleur cage to be employed by providing a secondary detent adjacent each of the primary detents 140 and 142. Thus, a secondary detent 148 is provided adjacent the smaller chain wheel primary detent 140, with a peak 150 between detents 140 and 148; and similarly, a secondary detent 152 is provided adjacent the larger chain wheel detent 142, with an intermediate peak between detents 142 and 152.

When riding cross-over with chain 52 engaged over the smaller chain wheel of cluster 50, the chain angles from the smaller chain wheel rearwardly and outwardly toward smaller sprockets of the rear freewheel 54. When the smaller chain wheel secondary detent 148 is engaged over cam pin 94, cam 136 is raised to pull the front derailleur cage laterally toward the larger chain wheel, thereby relieving engagement of the front derailleur cage against chain 52 and avoiding rasping. Conversely, when chain 52 is engaged over the larger chain wheel of cluster 50, in the cross-over position, chain 52 angles rearwardly and inwardly toward larger sprockets of freewheel 54, again tending to rasp against the front derailleur cage. In this situation, by shifting cam member 136 so that the larger chain wheel secondary detent 152 is engaged over cam pin 94, the front derailleur cage is enabled to be pulled by its return spring back toward the smaller chain wheel of cluster 50, thereby again relieving rasping of chain 52 against the chain cage.

The parallel and cross-over riding positions will be discussed further herinafter in connection with FIGS. 40-43, which illustrate these riding positions.

Secondary detents 148 and 152 constitute "fine-tune" cam positions which enable fine-tuning of the front derailleur cage regardless of the relative sprocket positions of chain 52 on the front chain wheel cluster and the rear freewheel, eliminating chain rasping and enable a relatively narrow front derailleur cage to be employed for accurate positive index shifting without likelihood of derailling.

It is to be noted that the fine-tune detents 148 and 152 in cam operating face 138 are outside of the cam face range for the primary front derailleur shifting, which range extends from the smaller chain wheel primary detent 140 up cam ramp 146 and past the peak 144 to the primary large chain wheel detent 142. Thus, as viewed in FIG. 15, the fine-tune detent 148 for the smaller chain wheel is located above the primary detent for the smaller chain wheel, while the fine-tune detent 152 for the larger chain wheel is located below the primary detent 142 for that chain wheel. With the fine-tune secondary detents 148 and 152 thus located, cam member 136 will not "trip over" either of the fine-tune detents when a primary shift is effected either upwardly or downwardly between the two primary detents 140 and 142, thus avoiding rider confusion which tended to occur with prior art front derailleur fine-tune attempts where the mechanisms did tend to trip over the fine-tune and provide false indications to the rider as to the actual front derailleur shifting location.

FIGS. 16-19 illustrate an alternative rear handgrip shift actuator, generally designated 160, wherein the cam portion 74' and cover portion 78' of the shift actuator are combined as a unitary molded structure. A cover bushing 82' is secured within the end of cover portion 78', preferably by ultrasonic welding, or alternatively by adhesive means. Handlebar collar 109 remains in the system as an aid in baffling against entry of dust or dirt into the region of cam portion 74'. Although the embodiment having the combined cam and cover portions 74' and 78' is simpler and more economical to manufacture than the form shown in detail in FIGS. 3-11, the embodiment of FIGS. 3-11 is presently preferred, since cover members 78 and bushings 82 are universally adapted for use with any of the cams for the various derailleur mechanisms. Thus, the universally usable cover members and bushings require less custom molding. Moreover, the embodiment of FIGS. 3-11 is also preferable since the functional characteristics desired for the plastic used in the cover member 78 are different from the functional characteristics desired for the plastic of which cam member 74 is made. Specifically, in the embodiment of FIGS. 3-11, a high-strength chemically lubricated plastic such as Delrin 500CL is preferred for cam member 74. Such plastic, however, is not best suited for use in either cover member 78 or bushing 82 for several reasons. It does not provide an aesthetically pleasing appearance, it does not have good ultraviolet resistance, and it tends to be slippery when grasped. Thus, a different type of plastic is used for cover member 78 in the embodiment of FIGS. 3-11, such as ABS, which is easily molded and provides both an aesthetically pleasing appearance and good ultraviolet resistance.

Nevertheless, the embodiment of FIGS. 16-19 wherein the cam and cover members are combined into a unitary structure 160 is contemplated within the scope of the present invention. When referring now to FIGS. 16-19, like reference numerals are used with primes for parts which correspond to those in the embodiment of FIGS. 3-11. Cam portion 74' is, by way of example and not of limitation, a 5-position cam wherein the cam operating face 99' has five detent valleys 114' separated by four rounded peaks 112'. As best seen in FIGS. 16 and 19, cam operating face 99' rides over a pin 94'. The 5-position cam operating face 99' cooperates through control cable 101' with a derailleur mechanism (not shown) embodying a 5-sprocket multiple freewheel. The middle detent 114' is shown engaged over cam pin 94' corresponding to engagement of the drive chain with the middle freewheel sprocket for the middle speed of the 5-speed system.

The rear handgrip shift actuator 66' shown in FIGS. 16-19 is rotatably mounted on the handlebar end portions 72' such that rotation of the combined cam and cover unit 160 causes axial displacement of control cable 101' operatively coupled to the derailleur mechanism. Control cable 101' extends through a diametrical bore 100' in cam pin 94', and thence through a bore 103' in the end portion of the combined cam and cover 160, terminating externally of such end portion in a crimped collar or cast-on metal bead 106' which bears against bearing plate 105' cast into the end portion of the combined cam and cover 160. Housing or casing 107' for control cable 101' has a ferrule 108' crimped on its end which is located within a counterbore 102' of the cam pin bore 100'.

Referring again to FIG. 19, the axial steps or spacings between successive detents 114 corresponding to successive freewheel sprocket destinations are approximately the same for the cam face profile 99' of cam portion 74'. This is enabled by the fact that cam portion 74' is matched to an overall rear derailleur system wherein cable 101' has minimal stretch, and the cable housing length is minimized in extent and is of a type having minimal compressability and warp under cable tension. Such a cable system is shown in FIGS. 20-26, and described in detail in connection with those Figures. Thus, as viewed in FIG. 19, from the position of the uppermost detent 114' being engaged over cam pin 94', at which location the derailleur mechanism return spring has its minimum loading, to the position at which the lowermost detent 114' is engaged over cam pin 94', where the derailleur mechanism return spring has its maximum loading, detents 114' do not have to be axially separated by progressively greater increments to accommodate cable stretch and/or cable housing compression and warp, whereby substantially equal axial increments between successive detents 114' are suitable for providing chain alignment with successive freewheel sprockets.

To the contrary, cam face detents 114 of cam 74 as viewed in FIG. 8 have increasing axial increments or separations from the position shown where the uppermost detent 114 is engaged over cam pin 94 successively down to where the lowermost valley 14 is engaged over cam pin 94, so as to accommodate a cable system which has considerable sponginess in it, caused by stretch in cable 101 and/or compression and warp in cable housing 107 as the force of the derailleur mechanism return spring increases for this succession of detents 114 being engaged over cam pin 94.

FIGS. 20-30 illustrate another derailleur-equipped bicycle, generally designated 10a, showing details of the derailleur apparatus, a presently preferred derailleur actuating cable system, and defining locations in the derailleur and cable systems of lost motion or "slop" which are accurately accounted for in the present invention.

As with the bicycle 10 shown in FIG. 1, bicycle 10a has a frame 12a including a head tube 14a, top tube 16a, main down tube 18a, seat tube 20a, bottom bracket 22a, front fork 24a, handlebar stem 28a, handlebar 32a with end portions 72a, and down fork 34a and bottom fork 36a. The rear ends of down fork 34a and bottom fork 36a are connected to a pair of spaced dropouts 170 within which the rear axle bolt 172 is fixedly mounted for supporting rear wheel 40a. The wheel hub rotates on ball bearings about axle bolt 172, and a lateral extension of the wheel hub supports the derailleur freewheel on its outside, with ratchet means therebetween which engages when chain power is applied to the freewheel, and disengages to allow free rolling of the rear wheel relative to the derailleur freewheel. A derailleur hanger 174 is integrally formed with dropout 170, extending downwardly therefrom.

A pedal crank, generally designated 46a, is journalled in bottom bracket 22a, and includes a pair of pedal arms 48a on opposite sides of frame 12a, and chain wheel cluster 50a on the right-hand side of frame 12a inboard of right-hand pedal crank 46a. The chain wheel cluster shown has two chain wheels, the operation of which in connection with the present invention will be discussed in detail hereinafter. Drive chain 52a is shown engaged over the larger of the two chain wheels, and extends rearwardly therefrom into engagement with derailleur multiple freewheel 54a for applying power to rear wheel 40a. The multiple freewheel 54a shown has a 6-sprocket cluster.

The front derailleur mechanism is generally designated 56a, and the rear derailleur mechanism is generally designated 58a. Front control cable 176 connects front derailleur mechanism 56a to a front handgrip shift actuator 62 shown in FIGS. 2, and 12 or 13, connecting in the same manner that cable 101 connects to the rear shift actuator 66 as shown in detail in FIGS. 3-11. The housing, support and adjustment features for front control cable 176 are similar to those of the rear control cable, but somewhat simplified, and will be described in detail in connection with the description of the rear derailleur cable system.

The rear derailleur cable system is generally designated 178, and includes rear control cable 180 which extends from rear derailleur mechanism 58a to rear handgrip shift actuator 66 that is mounted on handlebar end portion 72a. The connection of rear control cable 180 to rear shift actuator 66 is the same as shown in FIGS. 3-11 and described in detail in connection with those Figures.

The Rear Derailleur Mechanism

The apparatus of rear derailleur mechanism 58a is best illustrated in FIGS. 21 and 27-30. The novel cooperative mode of operation of rear handgrip shift actuator 66, rear cable system 178, and rear derailleur mechanism 58a is illustrated in FIGS. 31-36, and will be described in detail in connection therewith.

At the heart of rear derailleur mechanism 58a is a parallelogram generally designated 182 which has a rear support body pivotally but laterally fixedly connected to hanger 174, a pair of parallel links extending forwardly from the support body, and a shifter body attached to the forward ends of the links that is shiftable laterally inwardly toward the bicycle frame 12a under the influence of cable tension, and shiftable laterally outwardly away from frame 12a under the influence of a derailleur return spring contained in the parallelogram.

The rear support or mounting body is designated 184, and is pivotally mounted on a mounting bolt 186 which is threadedly connected to hanger 174 as best seen in FIG. 27. A helical pivot spring 188 around pivot bolt 186 is housed in support body 184 and biases support body 184 clockwise or forwardly about bolt 186. One end of spring 188 bears against body 184, while the other bears against a plate 190 as best seen in FIGS. 27 and 28. A support body angle adjust screw 191 on plate 190 bears against a shoulder 192 on hanger 174 for adjusting the effective torque of spring 188.

The forward shifter body 194 of parallelogram 182 is held parallel to support body 184 by the parallelogram linkage, and shifts transversely inwardly and outwardly relative to the frame 12a, and in particular, relative to the multiple freewheel 54a. An outer parallelogram link 196 connects support body 184 and shifter body 194 by means of respective pivot pins 198 and 200; and an inner parallelogram link 202 connects support body 1984 and shifter body 194 through respective pivot pins 204 and 206.

Figure 21:
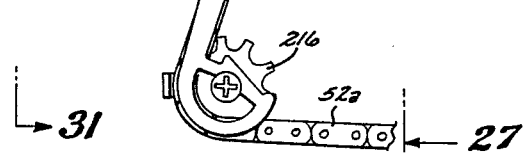
FIG. 21 is an enlarged fragmentary elevational view of the rear derailleur system of FIG. 20.

Derailleur return spring 208 is best seen in FIG. 29, and is a helical spring with its coil located around pivot pin 206, and having respective arms which bear against shifter body 194 and link 202 so as to bias parallelogram 182 toward a flattened, more closed condition, thereby biasing shifter body 194 laterally outwardly relative to frame 12a and freewheel 54a. A cable clamp 210 seen in FIGS. 21, 27 and 29 is mounted on outer parallelogram link 196 for clamping the end of cable 180. Increased tension on cable 180 pulls parallelogram 182 toward a more open, rectangular configuration, thereby moving shifter body 194 inwardly relative to frame 12a and freewheel 54a.

A pulley cage 212 is pivotally supported on the inner end of shifter body 194, extending downwardly therefrom. An upper guide or jockey pulley 214 is freely rotatably supported in the upper part of pulley cage 212 adjacent shifter body 194, and a lower tension pulley 216 is freely rotatably mounted in the lower portion of pulley cage 212. Cage 212 consists of outer and inner cage plates 218 and 220, respectively, outer cage plate 218 being mounted on a cage pivot bolt 222 which projects from shifter body 194. Pulley cage 212 is biased clockwise or rearwardly by means of a cage pivot tension spring 224 inside shifter body 194 which works against body 194 and outer cage plate 218.

Chain 52a extends rearwardly from one of the two chain wheels of chain wheel cluster 50a over one of the six sprockets of multiple freewheel 54a, then downwardly and forwardly over the front of guide pulley 214, then downwardly and rearwardly over the rear of tension pulley 216, and then forwardly back to the chain wheel. Guide pulley 214 shifts laterally according to lateral movements of shifter body 194 under the influence of rear control cable 180 as directed by rear handgrip shift actuator 66 so as to shift chain 52a downwardly or upwardly form sprocket to sprocket of freewheel 54a. As chain 52a shifts from a larger to a smaller sprocket on freewheel 54a, more chain becomes available in the overall chain loop, and tension pulley 216 moves rearwardly under the influence of cage pivot tension spring 224 to take up this slack. Conversely, as chain 52a shifts from a smaller to a larger sprocket of freewheel 54a, tension pulley 216 gives way forwardly against the force of tension spring 224 to provide the necessary additional chain length for the added circumference of the larger freewheel sprocket.

Rear Derailleur Cable System

The rear derailleur cable system is constructed to minimize and strictly limit lost motions or "slop" commonly found in bicycle shift cables, and make whatever lost motions that are inevitable as predictable as possible so they can be accurately taken up and compensated by cam member 74 in handgrip shift actuator 66. Such lost motions commonly occur from cable housing flexure under down-shifting cable tension toward rounding out of the cable housing, looseness of the cable in its housing, cable housing compression, cable stretch, and lost motion in cable adjustment barrels. Cable system 178 is also constructed to minimize friction between the cable and its housing so as to further reduce cable housing flexure, and to make down-shifting easier by substantially reducing the friction vector between housing and cable which opposes cable down-shifting movement, particulary under the relatively high pulling force on the cable that is required for down-shifting.

With these factors in mind, the rear cable housing is provided in two relatively short sections, a forward cable housing section 226 which extends into the handlebar end portion 72 and operatively connects with shift actuator 66 as shown in FIGS. 5-7, and a rearward cable housing section 228 which extends from a rearward location on bottom fork 36a to the rear derailleur mechanism 58a. Most of the length of rear control cable 180 is thus free of housing, and has only minimal friction against a guide under bottom bracket 22a discussed hereinafter in connection with FIGS. 22 and 23. The shortness of cable housing sections 226 and 228 greatly reduces cable compression lost motion and makes it very predictable.

Cable compression is further greatly reduced by employing a substantially axially compressionless cable housing or casing described hereinafter in connection with FIGS. 25 and 26. The construction of such substantially compressionless cable housing also greatly reduces cable housing flexure under cable down-shifting tension, and makes such flexure and consequent lost motion very predictable.

Figure 20:
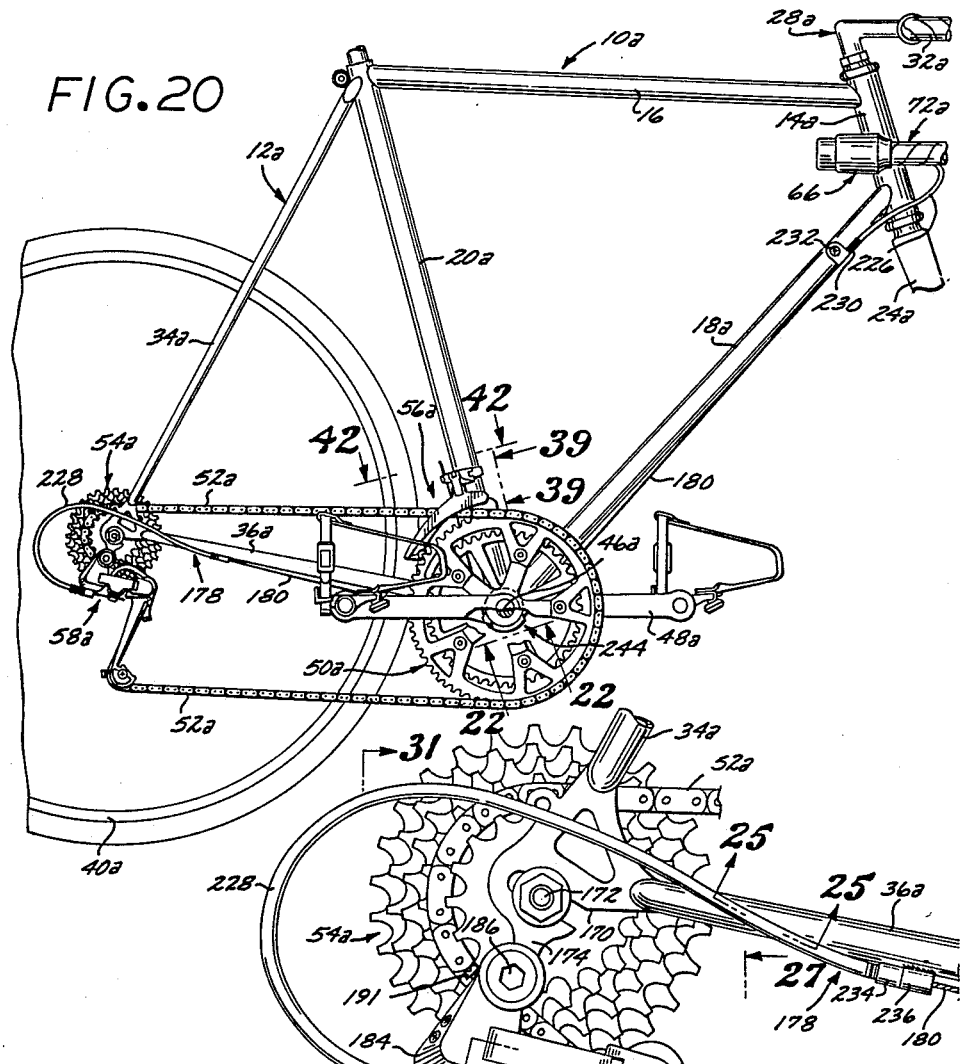
FIG. 20 is a fragmentary side elevational view of another bicycle embodying front and rear derailleurs.

Referring to FIG. 20, forward cable housing section 226 ends at a spring-loaded front cable housing adjustment barrel 230 through which cable 180 extends and which is adjustably threadedly engaged in a front bracket 232 that is affixed to the right-hand brazon near the upper end of down tube 18a. The rearward cable housing section 228 ends at a rear housing adjustment barrel 234 through which cable 180 passes and which is threadedly adjustably engaged in a rear bracket 236 that is secured to derailleur support body 184. As best seen in FIG. 24, a reduced threaded portion 238 of adjustment barrel 234 carries a helical compression spring 240 which resists inadvertent rotation of barrel 234 relative to its bracket 236. There is inevitable clearance between the barrel and bracket threads, spring 240 shifting barrel 234 slightly to the left relative to bracket 236 when cable 180 is under relatively small tension when a shift is not being made. However, during a down-shift when cable 180 is under relatively large tension, barrel 234 will move toward bracket 236 through such thread clearance, which represents lost motion in the cable system. Similar lost motion will occur between front adjustment barrel 230 and its bracket 232. A ferrule 242 is crimped over the end of rearward housing section 228 and is engaged within an axial recess in adjustment barrel 234.

Referring now to FIGS. 22 and 23, a cable guide bracket 244 is secured underneath bottom bracket 22a, and supports a pair of grooved, arcuate cable guides 236 and 248 under which the respective front and rear cables 176 and 180 freely slide. The front derailleur cable system, including cable 176, is the same as the forward portion of rear derailleur cable system 178. Thus, front cable 176 extends upwardly and forwardly along the main down tube 18a, passing through an adjustment barrel like barrel 230 which is threaded into a bracket like bracket 232 mounted on the left-hand brazon, front cable 176 then having a cable housing section like section 226 of rear cable system 178 which extends from the adjustment barrel into the handlebar end portion and connects to the front handgrip shift actuator 62 in the manner best shown in FIGS. 5–7. The rear cable extends exposed from adjustment barrel 230 rearwardly alongside main down tube 18a, under its guide 248, and thence rearwardly along bottom fork member 36a to the rear housing adjustment barrel 234.

FIGS. 25 and 26 illustrate the substantially axially compressionless cable housing, designated 250, which is employed for both of the cables 176 and 180, but shown with rear cable 180 therein. The core of housing 250 is an annular series of closely packed, primarily axially oriented wires 252 made of a tough metal such as steel. Wires 252 are arranged in a very slow or long helix, as for example a revolution in only about every three inches of length. The annular array of wires 252 is held in its circular configuration between an outer plastic jacket 254 and an inner plastic guide tube or liner 256. Inner guide tube 256 is made of a tough anti-friction plastic material such as a Delrin which, together with the short lengths of cable 250 in cable sections 226 and 228, greatly minimizes cable friction in the housing. Inner guide tube 256 is closely yet freely fitted about cable 180 to minimize lost motion in the curved portions of housing sections 226 and 228.

Applicant has determined that the substantially compressionless-type cable 250 not only substantially completely eliminates cable compression as a lost motion factor, but it also substantially minimizes the tendency for conventional cable to round out or give in a "monkey motion," thereby substantially eliminating two heretofore serious sources of lost motion.

Sources of Lost Motion in Rear Derailleur Mechanism

While the aforesaid cable system preferably employed as a part of the present invention has only minimal and very predictable lost motion, every derailleur system has numerous sources of lost motion which cumulatively add up to a substantial amount of lost motion at the cable connection 210, and this cumulative lost motion varies for almost every different derailleur system, over a range of from about 0.040 inch to about 0.070 inch. For positive index shifting with applicant's handgrip shift actuator 66, a separate cam member 74 is preferably provided for each type of derailleur mechanism so as to positively take up and account for the cumulative lost motion in each derailleur mechanism. The mode of operation of cam member 74 in this regard is described in detail hereinafter in connection with FIGS. 35 and 36.

FIG. 30 illustrates some of these points of lost motion or slop in conventional derailleur systems. First, there is a wobble type of lost motion of support body 184 on its pivot bolt 186 indicated at A in FIG. 30. Support body 184 torques downwardly or upwardly, depending upon whether the chain is being shifted inwardly to a larger freewheel sprocket or outwardly to a smaller freewheel sprocket. Next, there is lost motion at each of the four link pivot pins 198, 200, 204 and 206. When support body 184 torques or twists down as at A, then shifter body 194 twists upwardly, and when support body 184 torques or twists up, then shifter body 94 twists downwardly, these motions being indicated at B in FIG. 30. Whenever shifter body 194 twists, the parallelogram links 196 and 202 also twist as indicated at C in FIG. 30. Further, there is lost motion between cage pivot bolt 222 and shifter body 194, which translates into lost motion between pulley cage 212 and shifter body 194 as indicated at D in FIG. 30. Additionally, there is lateral lost motion of guide pulley 214 on its pivot axis.

Overshift

Shift actuator cam member 74 is not only configured at its operating face 99 to account and compensate for the cumulative lost motions referred to above, but also for an overshift increment in the down-shift direction to a larger freewheel sprocket. This overshift increment serves several functions. It is the lateral angle at which guide pulley 214 addresses the chain to the next larger freewheel sprocket which causes the larger sprocket teeth to snag the chain. By moving guide pulley 214 inwardly somewhat beyond the next larger sprocket so that the chain in effect angles across the teeth of the larger sprocket, the sprocket teeth more readily snag the chain plates to provide an earlier, more positive shift. The overshift increment also causes the chain to have its final movement during a down-shift event toward the destination sprocket from the direction of the next larger sprocket, whereby during a down-shifting event the chain makes its final approach to the destination sprocket in the same direction as it would for an up-shifting event. During an up-shifting event, as the chain approaches the smaller destination sprocket, cable tension is relaxed such that the cumulative lost motion has been relaxed or backlashed, and the force vector opposing cable movement to the final destination is small and stable because of low cable force laterally against the cable housing. The same factors hold true for a down-shift to a larger sprocket when overshift is employed so that the final destination is reached in the up-shift direction. Accordingly, both the down-shift and up-shift events to the same freewheel sprocket will result in the same accurate alignment of the chain with the sprocket. Initial alignment which is conveniently calculated for each freewheel sprocket during up-shifting thereby also provides the correct chain positioning for down-shifting to each sprocket.

Figure 31:
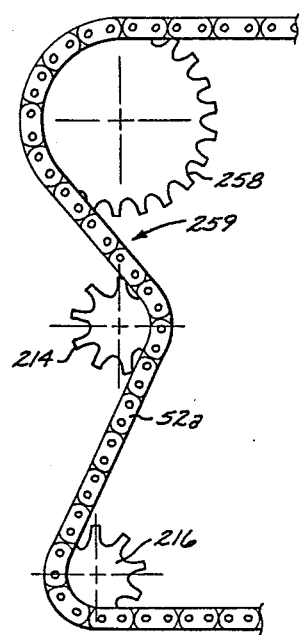
FIGS. 31 and 32 are diagrammatic views illustrating variations in chain gap.
Figure 32:
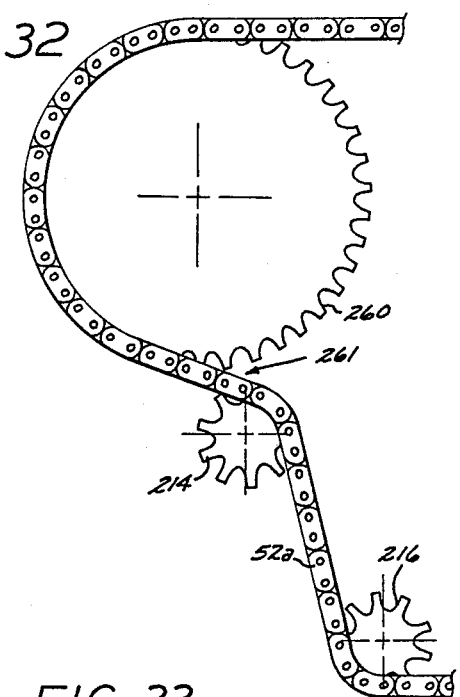

A factor which varies and which is accounted and compensated for in the cam operating face 99 of applicant's shift actuator cam member 74 is "chain gap." Chain gap is the length of chain between a particular freewheel sprocket and the derailleur guide pulley 214. For the purpose of the present description, chain gap is hereby defined as the length of chain between its tangent contacts with guide pulley 214 and a freewheel sprocket with which the chain is engaged or is to be engaged during a shifting event. Referring to FIGS. 31 and 32, FIG. 31 shows chain 52a engaged with the smallest sprocket 258 of freewheel 54a. This is the #6 sprocket, representing the highest gear ratio. It will be seen that the chain gap, designated 259, is relatively long. FIG. 32 shows chain 52a engaged with the largest sprocket 260 of freewheel 54a, and it will be seen that the chain gap 261 is relatively short. The chain gaps for the six freewheel sprockets vary successively from relatively long for the smaller freewheel sprockets to relatively short for the larger freewheel sprockets.

During down-shifting, the same lateral increment of movement of guide pulley 214 will cause the chain to approach a relatively small freewheel sprocket at a much shallower lateral angle than a relatively large freewheel sprocket, making it more difficult for the relatively small sprocket teeth to snag the chain than for the relatively large sprocket. Thus, for positive, early shifting, it is desirable to provide greater overshift for relatively small freewheel sprockets than is necessary for relatively large freewheel sprockets. For the relatively smaller sprocket, this will provide a steeper lateral angle of approach of the chain to the sprocket so that the sprocket teeth will more readily snag onto the chain and cause an earlier and more positive shift.

Figure 33:
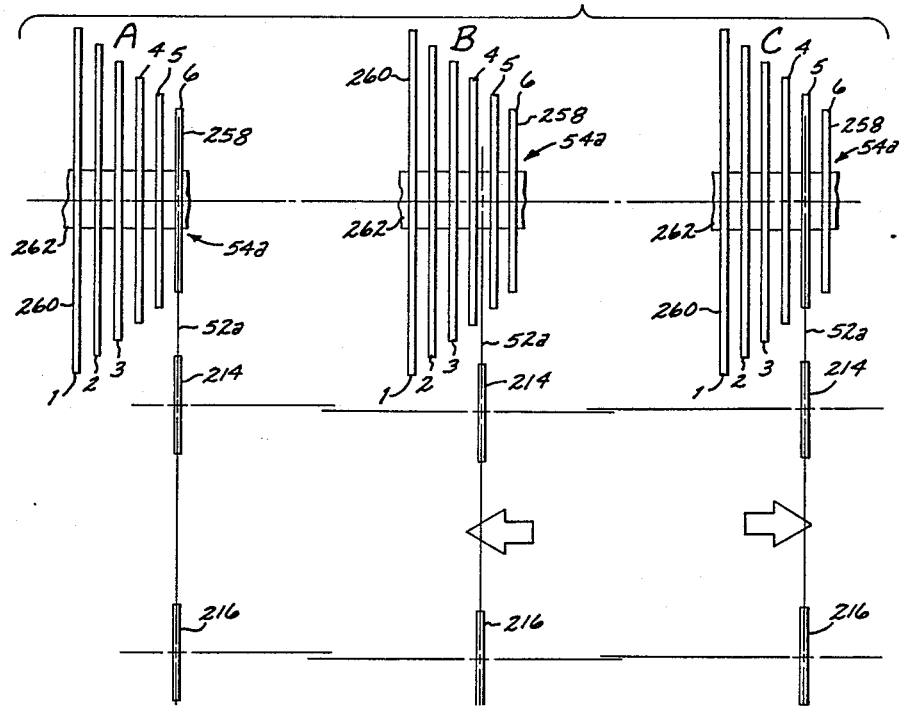
FIG. 33 is a diagrammatic view illustrating overshift.

FIG. 33 illustrates what is meant by "overshift." Each of FIGS. 33A, B and C diagrammatically illustrates rear derailleur freewheel 54 and its relationship to guide pulley 214 and chain 52a during a down-shifting event from freewheel sprocket #6, the smallest sprocket, to freewheel sprocket #5, the next smallest sprocket. The freewheel hub which overrides the wheel hub is diagrammatically illustrated as 262. The freewheel sprockets are numbered in their conventional order, from 1-6. In FIG. 33A, guide pulley 214 and chain 52a are operatively aligned with the #6 freewheel sprocket. A down-shift is to be made from sprocket #6 to sprocket #5, and FIG. 33B illustrates the overshift increment. Guide pulley 214 is moved or overshifted in the down-shifting direction substantially beyond alignment with the destination sprocket #5, moving chain 52a to this overshift position. Guide pulley 214 is then relaxed back to alignment with the destination sprocket #5, being moved under the influence of derailleur return spring 208 shown in FIG. 29, carrying chain 52a with it into accurate alignment with the destination sprocket #5 as shown in FIG. 33C. The final, aligned location of guide pulley 214 and chain 52a of FIG. 33C will be the same as the position of alignment for an up-shift from sprocket #4 to sprocket #5, the destination having been approached from the same direction with the cumulative lost motion released or backlashed, and the friction vector of the cable housing sections against the cable being the same.

Compensating for Variations in Derailleur Return Spring Force

Figure 34:
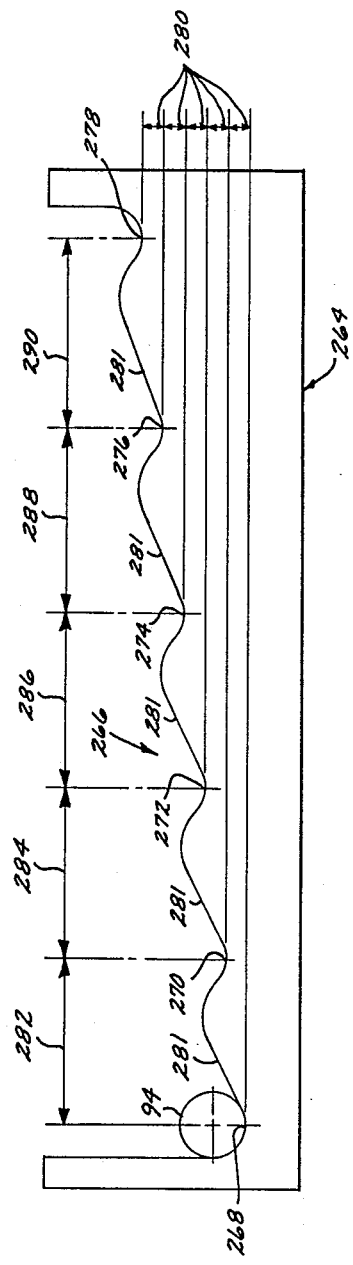
FIG. 34 is a diagrammatic view illustrating a cam face configuration which compensates for variations in derailleur return spring force.

FIG. 34 shows a 6-position cam member 264, laid out flat, for applicant's rear handgrip shift actuator 66 which has a cam operating face 266 configured for cooperation with a derailleur system embodying the cable system 178 described above. The successive cam detent valleys from the smallest sprocket, highest gear position to the largest sprocket, lowest gear position are designated 268, 270, 272, 274, 276 and 278. The axial spacings 280 between these successive detents are substantially the same, because with the cable system 178 there is no need for any material compensation in cam face 266 for conventional cable system lost motions.

However, down-shifting from the smallest sprocket position 268 to the largest sprocket position 278 successively increases the loading on derailleur return spring 208 during the shifts from freewheel sprocket to sprocket. To compensate for this progressively increasing return spring loading, cam ramps 281 of the successive cam lobes from the smallest sprocket detent 268 to the largest sprocket detent 278 are progressively flattened for progressively increasing mechanical advantage, thereby enabling the successive down-shifting increments to be effected with substantially the same amount of torque on handgrip shift actuator 66. Thus, the configuration of cam operating face 266 is such that the arcs of rotation between the successive shift locations will progressively increase, these succesive arcs being designated 282, 284, 286, 288 and 290.

Down-Shift Event

Figure 35:
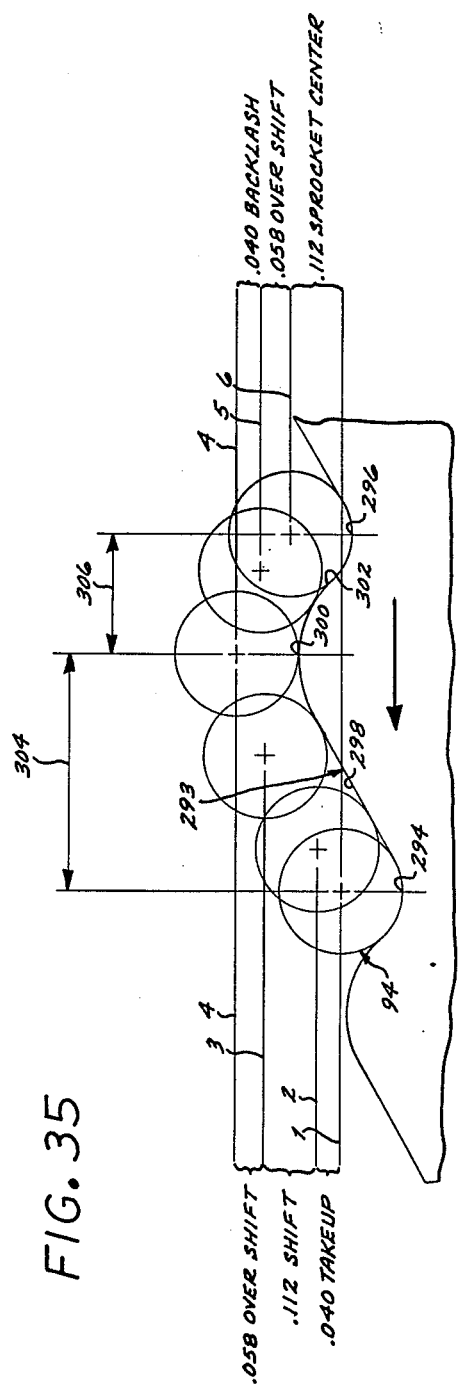
FIG. 35 is a diagrammatic illustration of a single down-shift event.

FIG. 35 diagrammatically illustrates a down-shift event controlled by a cam 292 embodied in a rear handgrip shift actuator 66 according to the invention. Cam 292 has an operating face 293 configured to produce a series of shifting increments which will reliably and repeatably produce positive index down-shifting events. As viewed, during the actual shifting event, cam pin 94 would be stationary in the horizontal rotational direction and movable by cam 292 in the vertical axial direction, while cam 292 would be movable to the left in the horizontal rotational direction. However, it is the relative rotational positioning between cam 292 and cam pin 94 which effects the shifting event, and for convenience of illustration cam 292 is shown stationary, and cam pin 94 is shown moving to the right in successive positions relative to cam 292.

During the shifting event, cam pin 94 is moved from a higher gear ratio detent 294 to the destination lower gear ratio detent 296, cam pin 94 riding from valley 294 up cam ramp 298, over peak 300, and down backslope 302 into valley 296. Cam operating face 293 is specifically configured for optimum positive index shifting of a Shimano Hyperglide rear derailleur mechanism, and the portion of cam operating face 293 illustrated in FIG. 35 is dimensioned for a down-shift event from freewheel sprocket #4 at detent 294 to freewheel sprocket #3 at detent 296. The successive axial positions of cam pin 94 relative to cam 292 are referenced to the center of cam pin 94, and are designated 1-6. In the actual mechanism of handgrip shift actuator 66, these six positions represent the successive axial positions of cam 292.

The combination of the Shimano Hyperglide rear derailleur mechanism 58a and applicant's rear derailleur cable system 178 have a cumulative lost motion of approximately 0.040 inch, and cam 292 first takes up this lost motion in its movement from position 1 to position 2. This rear derailleur mechanism 58a has a shift span from the center of freewheel sprocket 4 to the center of freewheel sprocket 3 of 0.112 inch. Accordingly, the next increment of movement of cam 292, from position 2 to position 3, causes this 0.112 inch lateral shifting movement in the derailleur mechanism 58a. Applicant's testing has determined that a 0.058 overshift movement of derailleur mechanism 58a will produce optimum early and positive index shifting from sprocket #4 to sprocket #3 in this particular derailleur mechanism, and accordingly cam operating face 293 is configured to provide an overshift increment of 0.058 inch from position 3 to position 4 in FIG. 35. At position 4, cam peak 300 is axially aligned with cam pin 94.

As this shifting event progresses down backslope 302, the 0.040 inch takeup is first released as backlash between positions 4 and 5, and then the overshift increment of 0.058 inch is released between positions 5 and 6, position 6 being the destination position at which the chain is aligned with freewheel sprocket #3. A critical factor in the shift event depicted in FIG. 35 is the backlash release on cam backslope 302 of substantially the entire takeup increment of 0.040 inch. This assures that the derailleur mechanism 58a and cable system 178 are substantially completely relaxed to the same condition they would be in at the end of an up-shifting event, thereby assuring the same alignment between chain and sprocket for both a down-shifting event and an up-shifting event to the same destination freewheel sprocket.

The takeup increment of the cumulative lost motion (0.040 inch in the example) plus the shift increment (0.112 inch in the example) is considered by applicant to be a minimum limit for the axial shifting movement of the cam member during each down-shifting event. This minimum axial down-shifting movement of the cam is best stated in terms of cam lobe height, which, in FIG. 35, is the height between detent 294 and peak 300, or the height between positions 1 and 4. Therefore, the minimum cam lobe height according to the invention is hereby defined as a sufficient cam lobe height to substantially account for both the lost motion in the derailleur and cable systems (takeup) and the spacing between the centers of the origin freewheel sprocket and the destination freewheel sprocket (shift).

It is presently preferred that the cam lobe height be sufficient that it will cause the derailleur mechanism to move the chain a sufficient amount beyond the destination freewheel sprocket in a down-shifting event so that the chain will approach the destination sprocket in the same direction as it would in an up-shifting event, such cam lobe height being sufficient to first release the backlash on the lobe backslope 302, and then allow some reverse chain movement toward the destination sprocket. Such chain reversal is an observable phenomenon. In a conventional cable system, cable housing compression and warping are only substantially completely released or backleashed when the cable tension friction vector that opposes down-shift cable movement is reversed to the lesser cable friction vector of up-shift cable movement.

It is preferred that the cam lobe heights exceed these minimum and preferred lower limits to account for wear that will increase the cumulative lost motion in the derailleur system.

Applicant considers the maximum limit for applicant's cam lobe height for each down-shift event except the final one to sprocket #1 to be such that the cam lobe not cause the derailleur system 178 to move the chain sufficiently far laterally inwardly to cause a double shift, i.e., to skip on over the destination sprocket to the next sprocket. For sprocket #1, applicant considers the upper limit for the respective cam lobe height to be such that it not cause the derailleur mechanism to move the chain laterally inwardly sufficiently to derail the chain off of sprocket #1. While applicant considers these to be the upper limits for the cam lobe heights, it is presently preferred that the cam lobe heights not cause the derailleur mechanism to shift the chain laterally during any down-shifting event sufficiently to cause chain rasp against the next freewheel sprocket inboard of the destination sprocket. Nevertheless, for optimum positive index shifting, applicant prefers that each cam lobe be sufficiently high to bring the chain as close to the next freewheel sprocket as possible without the chain rasping against the next sprocket. These maximum and preferred upper limits are observable phenomena.

The following chart provides down-shifting data for a Shimano Hyperglide rear derailleur mechanism 58a utilizing applicant's rear handgrip shift actuator 66 and rear cable system 178. This chart is given by way of example only, and not of limitation. This chart illustrates the operation of the invention as heretofore described in connection with FIG. 35. The first column, "Sprocket," gives the origin and destination freewheel sprockets, listing down-shift events from the smallest sprocket, #7, down to the largest sprocket, #1. The second column, "Takeup," represents movement from position 1 to position 2 in FIG. 35 accounting for lost motion in the derailleur and cable systems. The third column, "Shift," is the lateral spacing between origin and destination sprocket centers, represented by the shift increment from position 2 to position 3 in FIG. 35. The fourth column, "Overshift," lists the overshift increments provided by cam 292 from position 3 to position 4 in FIG. 35. The fifth column lists "Overtravel," which is the sum of "Takeup" and "Overshift," or the amount of axial cam travel greater than the "Shift" spacing between the origin and destination sprocket centers. The sixth column lists the amount of overtravel which will just cause double shift in the shifts down to freewheel sprockets 6, 5, 4, 3 and 2, and will just cause derailing in the final shift down to sprocket 1. The amount of takeup required for each down-shifting event is the same, indicating the same amount of cumulative lost motion in the systems. The shift increments vary for the different down-shift events according to variations in the freewheel sprocket spacings. The amount of overshift generally is reduced from the smaller sprockets down to the larger sprockets, principally because of successive reductions in the chain gap. In the shift from sprocket 2 to sprocket 1, the overshift is made small to avoid any possibility of derailling, and with the shortest chain gap at that location, positive index shifting is achieved with only a relatively small amount of overshift. Comparing the overtravel to the double shift figures, it is noted that the cam is configured to bring the chain closest to double shift in the region of the smaller sprockets. This is to produce early and positive index shifting despite the longer chain gaps in the region of the smaller sprockets.

| Sprocket Orig./Dest. | Takeup | Shift | Overshift | Overtravel | Dbl. Shift or Derail |
|---|---|---|---|---|---|
| 7-6 | .040 | .106 | .074 | .114 | .120 |

-continued

| Sprocket Orig./Dest. | Takeup | Shift | Overshift | Overtravel | Dbl. Shift or Derail |
|---|---|---|---|---|---|
| 6-5 | .040 | .107 | .067 | .107 | .110 |
| 5-4 | .040 | .103 | .066 | .106 | .110 |
| 4-3 | .040 | .112 | .058 | .098 | .110 |
| 3-2 | .040 | .126 | .058 | .098 | .120 |
| 2-1 | .040 | .133 | .019 | .059 | .120 |

Up-shift

Figure 36:
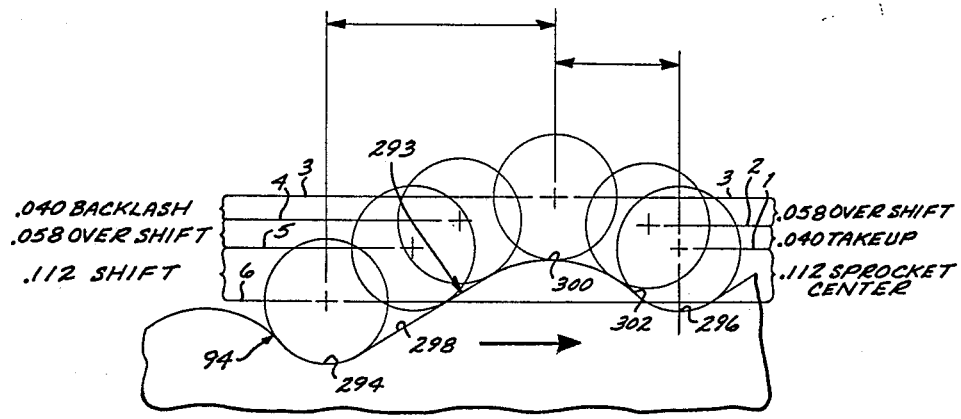
FIG. 36 is a diagrammatic illustration of a single up-shift event.

Up-shifting to a smaller sprocket does not require overshifting for accurate centering of the chain on the destination sprocket, and release of lost motions in the derailleur and cable systems is automatic. Nevertheless, with applicant's handgrip shift actuator system in which for a down-shift there is first takeup of the lost motion, next movement of a shift increment, and finally an overshift increment, when the shift actuator movement is reversed from that down-shift destination position so as to shift back up to a smaller sprocket, to get over the cam peak there will be, going up the backslope 302, takeup of the lost motion which had been left after the down-shift, plus takeup of the amount of overshift, before the cam ramp slides under the cam pin as the next lower cam detent moves toward the cam pin. This up-shift event is illustrated in FIG. 36, which is the same as FIG. 35 except for the reversed rotational direction of movement of cam 292. Referring for convenience to cam pin 94 as moving relative to cam operating face 293, pin 94 starts in the higher detent 296, then rides up backslope 302 and over peak 300, and thence down cam ramp 298 and into the destination higher gear ratio detent 294. Successive positions of pin 94 relative to cam operating face 293 are indicated by the numbers 1-6. At the #1 origin position, pin 94 is detented in the higher, lower gear ratio detent 296. The first increment of movement of cam 292 to the right relative to pin 94 takes up the cumulative lost motion which was left relaxed or backlashed after the previous down-shift or up-shift event. In the example, the takeup is approximately 0.040 inch. Next, the backslope 302 takes up the amount of overshift that would have been programmed for a down-shift from detent 294 to detent 296, in the example 0.058 inch. This is motion from point 2 to point 3, point 3 representing the location of pin 94 at peak 300. Then cam pin 94 rides down cam ramp 298, and the takeup on backslope 32 is first released as backlash between positions 3 and 4, this being approximately 0.040 inch in the example. Then the overshift is released between points 4 and 5, this being 0.058 inch. Finally, the up-shift to the smaller freewheel sprocket is effected between points 5 and 6, in the example 0.112 inch.

Undercut Cam

Figure 37:
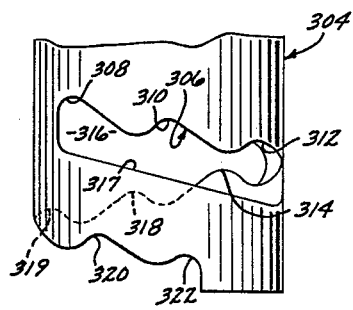
FIG. 37 is a fragmentary elevational view illustrating an elongated, undercut cam for accommodating an unusually large number of gear ratios.

Applicant's cam member 74 shown in FIGS. 4-10 has sufficient circular extent for its operating face 99 to occupy an arc substantially less than 360°, as for example about 325°, with room left for a stop projection 117 at the low gear end of the operating face, for up to about seven gear ratio cam positions, with the cam ramps being gentle enough for easy down-shifting. However, with more than about seven gear ratio positions, the cam ramps may have to be undesirably steep to accommodate the necessary axial displacement for effecting the shifts, and the resulting loss of mechanical advantage may make the twisting effort for down-shifting undesirably large. FIG. 37 illustrates a modified, undercut form of cylindrical cam, generally designated 304, which has an extended operating face 306 having eight shift locations while at the same time having gentle cam ramps for easy shifting with an 8-sprocket freewheel. The highest gear ratio detent for the smallest sprocket is designated 308, and in the elevational view of FIG. 37 it is seen at the front of the cylindrical cam member 304. Traversing operating face 306 toward the lower gear ratio, larger sprocket locations, the second and third detents 310 and 312, respectively, are both also seen from the front of cam member 304 as viewed in FIG. 37. However, the fourth detent 314 is at the rear of cam member 304 as viewed in FIG. 37, but is seen through undercut region 316 of cam member 304, which is an elongated, generally helical slot defined between cam operating face 306 and a helical edge, this slot having suficient axial dimension to accommodate the diametrical thickness of the cam pin. The next two succeeding detents 318 and 319 are still behind cam member 304, but out of view through the undercut region 316, and are therefore shown in dotted lines. The final two detents 320 and 322 for the lowest two gears are again on the front of cam member 304 as viewed in FIG. 37.

Fine-Tune Detents for Front Derailleur with 3-Chain Wheel Cluster

Figure 38:
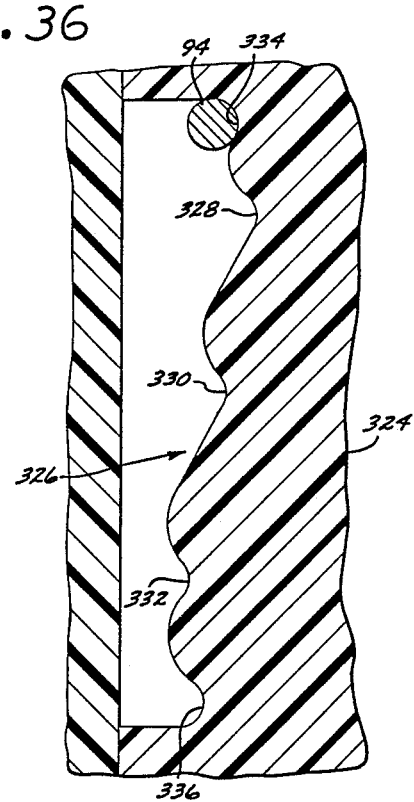
FIG. 38 is a developed view illustrating fine-tune detents for a cam of the invention adapted to control front derailleur shifting for a 3-chain wheel cluster.

In FIGS. 14 and 15, a cam 136 was shown which had two primary detents for a 2-chain wheel front derailleur cluster, with a secondary, fine-tune detent outside of each of the primary detents to counteract cross-over riding. FIG. 38 is a view similar to FIG. 15 showing a cam 324 operative for shifting the chain between the chain wheels of a front derailleur system embodying three chain wheels of small, medium and large diameters, having fine-tune secondary detents associated with the small and large diameter chain wheels. With three chain wheels in a front derailleur cluster, the small and large chain wheels may be spaced even further apart than they are in a 2-chain wheel cluster, so the cross-over problem referred to in connection with FIG. 15 may be more severe for a 3-chain wheel cluster.

Cam face 326 of cam 324 has three primary detents 328, 330 and 332 for the respective small, medium and large chain wheels. To avoid cross-over chain rasp when the chain is engaged over the small chain wheel, pin 94 may be engaged in a secondary, fine-tune detent 334 which will cause the front derailleur cage to move toward medium chain wheel detent 330 and thereby avoid or minimize chain rasp on the derailleur cage when riding with the chain crossed over. Similarly, a fine-tune secondary detent 336 is provided outside of the large chain wheel detent 332, and engagement of cam pin 94 in detent 336 will move the derailleur cage toward the location of medium chain wheel detent 330 so as to avoid or minimize chain rasp against the derailleur cage when riding with the chain crossed over.

Front Derailleur

FIGS. 39 and 42-44 illustrate details of construction of front derailleur mechanism 56a shown generally in FIG. 1. The parallelogram is generally designated 338 and is best seen in FIG. 39. The fixed member of parallelogram 338 is a support body 340 which is clamped to seat tube 20a by means of a clamp 342. The derailleur cage is generally designated 344, and consists of outer and inner cage plates 346 and 348, respectively, which are connected by an upper bridge member 350 seen in FIG. 39, and a lower bridge member 351 seen in FIGS. 42, 43 and 44. An outer, upper parallelogram link 352 is pivotally connected at its ends to support body 340 and cage 344 by means of respective pivot pins 354 and 356. An inner, lower parallelogram link 358 is also pivotally connected at its ends to support body 340 and cage 344. The cage connection pin is designated 360, but the support body connection pin is masked behind a portion of the support body as viewed.

A helical spring 362 best seen in FIGS. 39 and 42 is engaged about outer pivot pin 360 for link 358, and bears against link 358 and cage 344 so as to bias parallelogram 338 and hence cage 344 inwardly toward frame member 20a and thus inwardly toward the smaller chain wheel. Spring 362 is covered by a spring housing 364.

An actuator arm 366 extends upwardly and inwardly toward frame member 20a as an extension of the upper, outer link 352. Front derailleur cable 176 is attached to actuator arm 366 proximate its free end by means of a cable clamp 368 on actuator arm 366.

Front derailleur mechanism 56a is controlled by front handgrip shift actuator 62 through cable 176. The lost motion factors previously discussed with respect to the rear derailleur system are minimized in the front derailleur system by the simplicity of the mechanism and shortness of the cable. The lost motion factors may nevertheless be accounted for in the cam lobe heights in the same manner as discussed in detail with respect to the rear derailleur system and associated handgrip shift actuator.

FIG. 40 diagrammatically illustrates locations of chain 52a when a bicycle rider is riding "parallel." Chain wheel cluster 50a has two chain wheels, a large chain wheel 370 and a small chain wheel 372. Rear freewheel 54a is a 6-sprocket cluster, including sprockets numbered 1–6. In FIG. 40, chain cage 344 is longitudinally aligned with large chain wheel 370, and also substantially aligned with freewheel sprocket #5. In normal parallel riding, when the chain is engaged over large chain wheel 370, the rear derailleur mechanism will only be actuated to shift chain 52a between the three smallest freewheel sprockets, numbers 6, 5 and 4, and with any of these three freewheel sprockets, chain 52a will remain sufficiently aligned with cage 344 to avoid rasping against either of the outer or inner cage plates 346 and 348. Similarly, with cage 344 aligned with smaller chain wheel 372, with normal parallel riding, the rear derailleur will only be actuated to locate the chain on one of the three largest freewheel sprockets, numbers 1, 2 and 3, and chain rasp will be avoided.

FIG. 41 illustrates the cross-over riding situation in which chain 52a is engaged on the larger chain wheel 370, but where the rear derailleur has been actuated to place the chain over one of the three largest freewheel sprockets, numbers 1, 2 or 3. This will cause chain rasp against inner cage plate 348, unless an undesirably wide chain cage 344 is provided. Such a large chain cage is conventional to accommodate cross-over riding, but can readily lead to derailling. Still referring to FIG. 41, if the chain were located over the smaller chain wheel 372, and located on one of the three smallest freewheel sprockets 4, 5 or 6, a reverse cross-over situation would occur in which the chain would rasp against outer cage plate 346.

FIG. 42 shows the parallel riding situation of FIG. 40, wherein chain 52a is engaged over the larger chain wheel 370, and the chain is generally centered through cage 344. FIG. 43 shows the cross-over situation of FIG. 41, with the chain engaged over the larger chain wheel 370 at the front, and engaged over one of the three largest freewheel sprockets 1, 2 or 3 at the rear. The chain is seen to be rasping against inner cage plate 348 at the front of chain cage 344. FIG. 44 shows chain 52a again properly aligned in chain cage 344 after a fine-tune adjustment has been made with the cam 136 shown in FIGS. 14 and 15, the cam being moved from a position like detent 142 in cam 136 which will produce the result of FIG. 43 to fine-tune detent 152 which will bring the chain into alignment with cage 344 as seen in FIG. 44.

Inboard Handgrip Shift Actuators

FIGS. 45–50 illustrate alternative handgrip shift actuators according to the invention which are located inboard of the handlebar ends, preferably immediately inboard of conventional handgrips. This form of the invention is particularly suitable for "mountain bikes," since riders of mountain bikes like the fixed handgrips at the ends of the handlebar for best control.

FIG. 45 illustrates the front end portion of a mountain bike, generally designated 370, which has a widespread handlebar 372 that angles slightly rearwardly. Conventional left and right grips 374 and 376, respectively, are located on the ends of handlebar 372. Front handgrip shift actuator 378 is engaged over handlebar 372 immediately inboard of left grip 374, and rear handgrip shift actuator 380 is engaged over handlebar 372 immediately inboard of right grip 376.

The front derailleur cable system is generally designated 382, and includes front control cable 384 and cable housing or casing 386. Front cable system 382 for mountain bike 370 is preferably the same system as that employed on the bicycle 10a shown in FIG. 20, with cable housing 386 terminating at an adjustment barrel arrangement like that shown in FIG. 24, cable 384 extending down alongside main down tube 388 and riding under the bottom bracket as shown in FIGS. 22 and 23, and with substantially compressionless cable housing like that shown in FIGS. 25 and 26.

The rear derailleur cable system is generally designated 390, and includes rear control cable 392, forward cable housing or casing 394, and a rearward cable housing (not shown) like that seen in FIGS. 20 and 21. Rear cable system 390 is preferably the same as rear cable system 178 shown in FIGS. 20–26 and described in detail in connection with those figures.

FIGS. 46–50 illustrate details of construction of front handgrip shift actuator 378. Actuator 378 has a tubular support body 396 comprised of an elongated inner portion 398 with a cylindrical outer surface 400, and a radially enlarged outer collar portion 402. Inner portion 398 extends from collar portion 402 in the direction of the handlebar end. Collar portion 402 has a cylindrical outer surface 404 which is coaxial with the cylindrical outer surface 400 of the support body inner portion 398. A cylindrical bore 406 extends through the length of support body 396 and has its axis laterally offset from or eccentric relative to the cylindrical outer surfaces 400 and 404, providing a relatively thick side of support body 396 for containing the cam actuating mechanism and receiving the cable housing end, while at the same time maintaining a minimum diametrical dimension for shift actuator 378.

An axially directed cam follower slot 408 is provided on the outside of inner body portion 398, extending the length of inner portion 398. Support body 396 is engaged over handlebar 372, and locked in fixed position relative to handlebar 372 by means of a set screw 410 seen in FIG. 46.

A cylindrical cam member 412 is affixed within a generally cylindrical housing 414, being locked to housing 414 by an annular array of pins 416 seen in FIGS. 47 and 50. Cam member 412 has an annular inboard end 418 which rotatably seats against body collar portion 402, and a generally helical cam operating face 420 formed on its outboard end. Cam operating face 420, being configured to cooperate with the front derailleur mechanism, may have a profile similar to any of those shown in FIGS. 13, 15 and 38.

Rear handgrip shift actuator 380 is constructed in the same manner as front actuator 378, except for the cam face configuration, which is adapted for cooperation with the rear derailleur system. The cam member in rear shift actuator 380 embodies the features heretofore described in detail, and may have a profile similar to any of those illustrated in FIGS. 8, 19, 34 or 35.

Cylindrical housing 414 has a radially inwardly directed flange 422 at its outboard end which registers with the outboard end of body inner portion 398 to provide a barrier against entry of dust and dirt into the mechanism of shift actuator 378. At the inboard end of actuator 378, housing 414 overlaps body collar portion 402 to similarly provide a barrier against entry of dust and dirt into the actuator mechanism.

A cam follower plate 424 rides generally axially in follower slot 408, and has a radially outwardly directed follower pin 426 rigidly secured thereto. Cam follower pin 426 rides against cam operating face 420 as seen in FIGS. 47, 48 and 49, following the profile of cam face 420. A metal bead 428, which may be made of lead, is cast onto the end of front control cable 384, and seats in a complementary recess 430 in cam follower plate 424. A ferrule 432 crimped on the end of cable housing 366 seats in a recess 434 in collar portion 402 of body 396 to complete the cable connections to shift actuator 378.

Handgrip shift actuators 358 and 360 cooperate with respective front and rear derailleur systems in the same manner as heretofore described in detail for respective shift actuators 62 and 66, with all of the same advantages.

Although applicant's handgrip actuators preferably embody cam operating faces which are generally helical in configuration with the detents and peaks along the helix, it is to be understood that alternative configurations may be provided without the detents and peaks being located on the helix. For example, the cam operating face with the detents and peaks may be generally circular, with a lead screw advancing and retracting the cam member, or with a separate cam having a simple helical cam slope performing the advancing and retracting functions.

While the present invention has been shown and described herein in what are conceived to be the most practical and preferred embodiments, it is recognized that departures may be made therefrom within the scope of the invention, which is therefore not to be limited to the details disclosed herein, but is to be afforded the full scope of the appended claims.

What is claimed is:

1. A bicycle derailleur gear shifting system, which comprises:

derailleur shifting means having return spring means operatively associated with the rear wheel of the bicycle;

handgrip shift actuator cam means rotatably mounted on the bicycle handlebar generally coaxially of the handlebar;

control cable means having one end operatively associated with said cam means and the other end operatively connected to said derailleur shifting means, said cable means being biased toward said derailleur shifting means by said return spring means;

said cam means being configured so that rotational movement thereof in one direction will cause said cam means to pull said cable means against the biasing force of said spring means so as to cause down-shifting of said shifting means, and rotation thereof in the opposite direction will release said cable means in the direction of the biasing force of said spring means so as to cause up-shifting of said shifting means.

2. A bicycle derailleur gear shifting system as defined in claim 1, wherein said cam means is engaged over the outside of the handlebar proximate an end of the handlebar.

3. A bicycle derailleur gear shifting system as defined in claim 1, wherein said cam means is engaged over the outside of the handlebar substantially inboard of an end of the handlebar.

4. A bicycle derailleur gear shifting system as defined in claim 1, wherein said cam means is configured so as to substantially compensate for increasing force of said return spring means in the down-shifting direction of said derailleur shifting means.

5. A bicycle derailleur gear shifting system as defined in claim 1, wherein said cam means is configured so as to substantially compensate for the lost motions in said derailleur shifting means and said cable means.

6. A bicycle derailleur gear shifting system as defined in claim 5, wherein said cable means embodies housing means which is substantially compressionless, thereby making lost motion in said cable means small and substantially predictable.

7. A bicycle derailleur gear shifting system as defined in claim 5, wherein said derailleur shifting means is a rear derailleur shifting means, and said cable means comprises a first relatively short cable housing section proximate said cam means and a second relatively short cable housing section proximate said derailleur shifting means, with a relatively long unhoused length of said cable means extending between said first and second cable housing sections.

8. A bicycle derailleur gear shifting system as defined in claim 5, wherein said derailleur shifting means is a front derailleur shifting means, and said cable means comprises a relatively short cable housing section proximate said cam means, with a relatively long unhoused length of said cable means extending between said cable housing section and said derailleur shifting means.

9. A bicycle derailleur gear shifting system as defined in claim 1, wherein said cam means is configured so as to substantially compensate for chain gap variations in said derailleur shifting means.

10. A bicycle derailleur gear shifting system as defined in claim 1, wherein said derailleur shifting means is a rear derailleur shifting means, and said cam means is configured so as to cause said derailleur shifting means to move the bicycle chain a sufficient amount beyond the destination freewheel sprocket of said derailleur shifting means in a down-shifting event so that the chain will approach the destination sprocket in the same direction as it would in an up-shifting event.

11. A bicycle derailleur gear shifting system as defined in claim 10, wherein said cam means is configured so that said movement of the bicycle chain beyond said destination sprocket is insufficient to cause a double shift.

12. A bicycle derailleur gear shifting system as defined in claim 10, wherein said destination sprocket is the largest freewheel sprocket, and said cam means is configured so that movement of the bicycle chain beyond said destination sprocket is insufficient to cause the chain to derail from said destination sprocket.

13. A bicycle derailleur gear shifting system as defined in claim 10, wherein said cam means is configured so that said movement of the bicycle chain beyond said destination sprocket is insufficient to cause the chain to rasp against the next sprocket beyond said destination sprocket.

14. A bicycle derailleur gear shifting system as defined in claim 1, wherein said derailleur shifting means is a front derailleur shifting means, and said cam means is configured with first and second locations which causes said derailleur shifting means to substantially align the bicycle chain with respective first and second derailleur chain wheels during parallel riding, and a third location which causes said derailleur shifting means to substantially align the chain with one of said chain wheels during cross-over riding.

15. A bicycle derailleur gear shifting system as defined in claim 14, wherein said cam means is configured with a fourth location which causes said derailleur shifting means to substantially align the chain with the other said chain wheel during cross-over riding.

16. In a bicycle derailleur gear shifting system having a rear derailleur shifting mechanism, a shift actuator, and control cable means operatively connecting said actuator to said shifting mechanism, a method of performing down-shifting events from a relatively smaller origin freewheel sprocket to a relatively larger destination freewheel sprocket, which comprises:
first moving said shift actuator a sufficient amount to take up substantially all of the cumulative lost motion in said derailleur mechanism and said cable means; and
then moving said shift actuator a further amount to as to move the bicycle chain at least substantially the distance between the centers of said origin and destination sprockets.

17. A method according to claim 16, which comprises minimizing said cumulative lost motion and making it more predictable by providing said cable means with housing means that is substantially compressionless.

18. A method according to claim 17, which comprises further minimization of said cumulative lost motion by providing said cable means with relatively short cable housing means and a relatively long cable portion that is unhoused.

19. A method according to claim 16, which comprises moving said shift actuator a sufficient amount to substantially compensate for chain gap variations in said derailleur shifting means.

20. A method according to claim 16, which comprises first moving said shift actuator a sufficient amount to cause the bicycle chain to first move beyond said destination sprocket, and then moving said shift actuator back to cause the chain to move back to substantial alignment with said destination sprocket, whereby the chain approaches the destination sprocket in the same direction as it would in an up-shifting event.

21. A method according to claim 20, wherein the bicycle chain is not moved beyond said destination sprocket a sufficient amount to cause a double shift.

22. A method according to claim 20, wherein said destination sprocket is the largest freewheel sprocket, and wherein the bicycle chain is not moved beyond said destination sprocket a sufficient amount to cause the chain to derail from said destination sprocket.

23. A method according to claim 20, wherein the bicycle chain is not moved beyond said destination sprocket a sufficient amount to cause the chain to rasp against the next sprocket beyond said destination sprocket.

24. A method according to claim 16, wherein said shift actuator comprises cam means rotatably mounted on the bicycle handlebar generally coaxially of the handlebar.

25. In a bicycle derailleur gear shifting system having a front derailleur shifting mechanism having a chain cage, a shift actuator, and control cable means operatively connecting said actuator to said shifting mechanism, a method of compensating for chain misalignment during cross-over riding, which comprises:
first moving said actuator an amount which would be sufficient to substantially align the bicycle chain with one of the front derailleur chain wheels during parallel riding; and
then moving said actuator a further amount to move the chain toward another of said chain wheels to compensate for cross-over riding and minimize chain rasp against said cage.

26. A method according to claim 25, wherein said shift actuator comprises cam means rotatably mounted on the bicycle handlebar generally coaxially of the handlebar.

* * * * *

UNITED STATES PATENT AND TRADEMARK OFFICE
CERTIFICATE OF CORRECTION

PATENT NO. :  4,900,291
DATED      :  February 13, 1990
INVENTOR(S) :  Sam H. Patterson It is certified that error appears in the above-identified patent and that said Letters Patent is hereby corrected as shown below:

In Colume 5, line 25, after "form of" delete "grip" and insert therefore --handgrip--.

Signed and Sealed this

Tenth Day of March, 1998

Attest:

BRUCE LEHMAN

Attesting Officer

Commissioner of Patents and Trademarks

REEXAMINATION CERTIFICATE (4055th)

United States Patent [19]
Patterson

[11] B1 4,900,291
[45] Certificate Issued Apr. 25, 2000

[54] BICYCLE GEAR SHIFTING METHOD AND APPARATUS

[75] Inventor: Sam H. Patterson, Chicago, Ill.

[73] Assignee: SRAM Corporation, Chicago, Ill.

Reexamination Requests:
No. 90/004,540, Feb. 5, 1997
No. 90/004,809, Aug. 14, 1997

Reexamination Certificate for:
Patent No.: 4,900,291
Issued: Feb. 13, 1990
Appl. No.: 07/293,521
Filed: Jan. 5, 1989

Related U.S. Application Data

[63] Continuation-in-part of application No. 07/291,359, Dec. 29, 1988, abandoned, which is a continuation of application No. 07/141,625, Jan. 6, 1988, abandoned.

[51] Int. Cl.$^7$ ........................................................ F16H 9/24
[52] U.S. Cl. .............................. 474/80; 74/488; 74/501.6

[56] References Cited

U.S. PATENT DOCUMENTS

| | | | |
|---|---|---|---|
| 3,020,778 | 2/1962 | Davidson | 74/489 |
| 3,257,863 | 6/1966 | Hanson | 74/501 |
| 3,352,173 | 11/1967 | Freeland . | |
| 3,383,940 | 5/1968 | Brilando et al. . | |

(List continued on next page.)

FOREIGN PATENT DOCUMENTS

| | | | |
|---|---|---|---|
| 829283 | 3/1938 | France . | |
| 829283 | 6/1938 | France | 5/10 |
| 957906 | 2/1950 | France . | |
| 992651 | 10/1951 | France | 3/5 |
| 1064563 | 5/1954 | France | 5/10 |

(List continued on next page.)

OTHER PUBLICATIONS

"Accessories and Components at the Paris Show," *Le Cycle*, Issue No. 97, Dec. 1968, pp. 13–16, 20, 71.

*Schwinn Bicycle Service Manual*, 1970, pp. 749–756.

*Bicycling*, Jan./Feb. 1980, "All About Rear Derailleurs," Frank Berto, pp. 75–82, 85, 88.

*Bicycling*, Mar. 1980, Frank Berto, "All About Front Derailleurs," pp. 122, 123, 126, 127.

*Bicycle Practical Handbook*, 4th. Ed., Sep. 25, 1982, p. 1003, with English translation of encircled paragraph.

*Japanese Industrial Standards (JIS) Cycles*, Jun. 25, 1986, p. 225, Fig. 2, with English translation of encircled paragraph.

*Bicycling* magazine's *Complete Guide to Upgrading Your Bike*, by Frank Berto, published 1988, pp. 52–69.

SRAM Corporation's First Requests For Admissions to Plaintiff Shimano American Corporation, U.S. Dist. Ct., Central Div. of California, Southern Division, Jan. 1997.

(List continued on next page.)

*Primary Examiner*—Roger Schoeppel

[57] ABSTRACT

A bicycle derailleur gear shifting system having a rotatable handgrip actuator cam which is coupled with the derailleur shifting mechanism through a control cable system so as to control the derailleur mechanism. Separate actuator cams are associated with the front and rear derailleurs. For the down-shifting direction, at least the rear derailleur cam is configured so as to substantially compensate for increasing force of the derailleur return spring; so as to substantially compensate for numerous cumulative lost motions in the derailleur shifting mechanism and cable system, and for chain gap variations; and so as to overshift the chain a sufficient amount beyond the destination freewheel sprocket so that the chain will approach the destination sprocket in the same direction as it would in the up-shift direction, but not sufficient to cause a double shift, or derailling from the #1 sprocket. A front derailleur cam is configured to provide fine-tuning for "cross-over" riding.

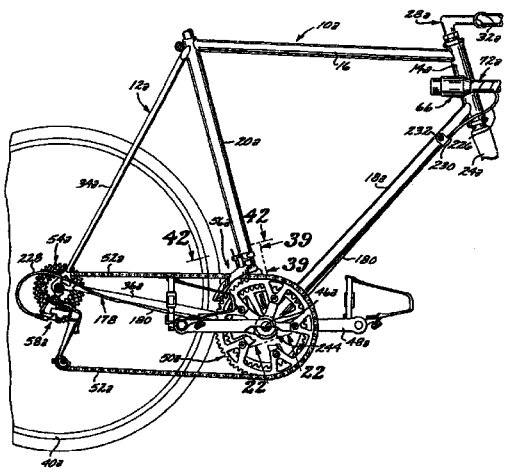

U.S. PATENT DOCUMENTS

| | | | |
|---|---|---|---|
| 3,583,249 | 6/1971 | Morse . | |
| 3,633,437 | 1/1972 | Ishida | 74/489 |
| 3,886,806 | 6/1975 | Nagano | 74/491 |
| 3,915,029 | 10/1975 | Shimada . | |
| 3,943,794 | 3/1976 | Shimada . | |
| 3,972,247 | 8/1976 | Armstrong . | |
| 4,037,484 | 7/1977 | Morse . | |
| 4,055,093 | 10/1977 | Ross | 74/501 R |
| 4,194,408 | 3/1980 | Hedrich | 74/217 B |
| 4,196,643 | 4/1980 | Nagano | 74/531 |
| 4,201,095 | 5/1980 | Cirami | 74/217 B |
| 4,259,879 | 4/1981 | Watarai . | |
| 4,260,171 | 4/1981 | Foster | 280/279 |
| 4,267,744 | 5/1981 | Yamasaki | 474/82 X |
| 4,270,481 | 6/1981 | Watarai . | |
| 4,304,143 | 12/1981 | Nagano . | |
| 4,325,267 | 4/1982 | Kojima . | |
| 4,384,864 | 5/1983 | Bonnard | 474/82 |
| 4,412,828 | 11/1983 | Darby | 474/81 |
| 4,437,357 | 3/1984 | Ozaki et al. . | |
| 4,454,784 | 6/1984 | Shimano . | |
| 4,530,678 | 7/1985 | Wechsler | 474/81 |
| 4,548,092 | 10/1985 | Strong | 74/475 |
| 4,601,682 | 7/1986 | Nagano . | |
| 4,626,229 | 12/1986 | Nagano . | |
| 4,637,809 | 1/1987 | Nagano . | |
| 4,690,662 | 9/1987 | Nagano . | |
| 4,693,700 | 9/1987 | Chappell | 474/80 |
| 4,736,651 | 4/1988 | Nagano . | |
| 4,742,728 | 5/1988 | Nagano . | |
| 4,751,850 | 6/1988 | Nagano | 74/488 |
| 4,751,852 | 6/1988 | Nagano . | |
| 4,815,330 | 3/1989 | Nagano . | |
| 4,840,605 | 6/1989 | Testa . | |
| 4,842,568 | 6/1989 | Marchigiano . | |
| 4,864,885 | 9/1989 | Nagano . | |
| 4,898,046 | 2/1990 | Mancewicz | 74/502.5 |
| 4,919,004 | 4/1990 | Nagano . | |
| 4,930,368 | 6/1990 | Nagano . | |
| 5,012,692 | 5/1991 | Nagano . | |
| 5,020,387 | 6/1991 | Nagano | 74/475 |
| 5,044,213 | 9/1991 | Nagano . | |

FOREIGN PATENT DOCUMENTS

| | | | |
|---|---|---|---|
| 1499803 | 10/1967 | France . | |
| 2575434 | 7/1986 | France . | |
| 208680 | 2/1940 | Germany . | |
| 170684 | 8/1951 | Germany . | |
| 3215427 A1 | 10/1983 | Germany . | |
| 85 36 537 U | 4/1986 | Germany | B62M 25/04 |
| 8536537 | 4/1986 | Germany | B62M 25/04 |
| 410248 | 3/1945 | Italy . | |
| 58-191682 | 11/1963 | Japan | B62M 25/04 |
| 44-26571 | 11/1969 | Japan . | |
| 56-31519 | 7/1981 | Japan | B62M 25/04 |
| 60-209376 | 10/1985 | Japan . | |
| 60-209377 | 10/1985 | Japan . | |
| 60-184793 | 12/1985 | Japan | B62M 25/04 |
| 61-33380 | 2/1986 | Japan . | |
| 62-13911 | 11/1987 | Japan | B62M 25/04 |
| 198601 | 6/1938 | Switzerland . | |
| 488002 | 6/1938 | Switzerland . | |
| 198601 | 9/1938 | Switzerland . | |
| 349765 | 6/1931 | United Kingdom . | |
| 454392 | 9/1936 | United Kingdom . | |
| 488002 | 6/1938 | United Kingdom . | |
| 571489 | 8/1945 | United Kingdom . | |
| 688897 | 3/1953 | United Kingdom . | |

OTHER PUBLICATIONS

Expert Report of Frank J. Berto, P.E., dated Mar. 31, 1997.
Article entitled "All about Indexed Shifting" in Bicycling Magazine, Jan.–Feb. 1988 issue, pp. 108–116 and 128.
Jim Redcay article entitled "The New Dura–Ace" in Bicycling Magazine, Jan.–Feb. 1985 issue, pp. 162–171 and 174.
Shimano Dura–Ace advertisement in Bicycling Magazine, Mar. 1985 issue, page #unspecified.
Shimano Dura–Ace advertisement in Bicycling Magazine, May 1985 issue, page #unspecified.
Suntour Accushift advertisement in Bicycling Magazine, Dec. 1986 issue, pp. 30–31.
*Le Cycle,* No. 97, Dec. 1968, pp. 13, 14 & 16; Mar. 1968, p. 20; Oct. 1968, p. 71.
*Schwinn Bicycle Service Manual,* vol. 2, 1972, pp. 749–756.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 25 and 26 is confirmed.

Claims 1–3 are cancelled.

Claims 4, 5, 9–14, 16, 17, 19 and 21–23 are determined to be patentable as amended.

Claims 6–8, 15, 18, 20 and 24, dependent on an amended claim, are determined to be patentable.

New claim 27 is added and determined to be patentable.

4. A bicycle derailleur gear shifting system [as defined in claim 1,] *which comprises:*

*derailleur shifting means having return spring means operatively associated with the rear wheel of the bicycle;*

*handgrip shift actuator indexing cam means rotatably mounted on the bicycle handlebar substantially inboard of an end of the handlebar generally coaxially of the handlebar;*

*control cable means having one end operatively associated with said cam means and the other end operatively connected to said derailleur shifting means, said cable means being biased toward said derailleur shifting means by said return spring means;*

*said cam means being configured so that rotational movement thereof in one direction will cause said cam means to pull said cable means against the biasing force of said spring means so as to cause down-shifting of said shifting means, and rotation thereof in the opposite direction will release said cable means in the direction of the biasing force of said spring means so as to cause up-shifting of said shifting means;* wherein said cam means is configured so as to substantially compensate for increasing force of said return spring means in the down-shifting direction of said derailleur shifting means.

5. A bicycle derailleur gear shifting system [as defined in claim 1,] *which comprises:*

*derailleur shifting means having return spring means operatively associated with the rear wheel of the bicycle;*

*handgrip shift actuator indexing cam means rotatably mounted on the bicycle handlebar substantially inboard of an end of the handlebar generally coaxially of the handlebar;*

*control cable means having one end operatively associated with said cam means and the other end operatively connected to said derailleur shifting means, said cable means being biased toward said derailleur shifting means by said return spring means;*

*said cam means being configured so that rotational movement thereof in one direction will cause said cam means to pull said cable means against the biasing force of said spring means so as to cause down-shifting of said shifting means, and rotation thereof in the opposite direction will release said cable means in the direction of the biasing force of said spring means so as to cause up-shifting of said shifting means;* wherein said cam means is configured so as to substantially compensate for the lost motions in said derailleur shifting means and said cable means.

9. A bicycle derailleur gear shifting system [as defined in claim 1,] *which comprises:*

*derailleur shifting means having return spring means operatively associated with the rear wheel of the bicycle;*

*handgrip shift actuator indexing cam means rotatably mounted on the bicycle handlebar substantially inboard of an end of the handlebar generally coaxially of the handlebar;*

*control cable means having one end operatively associated with said cam means and the other end operatively connected to said derailleur shifting means, said cable means being biased toward said derailleur shifting means by said return spring means;*

*said cam means being configured so that rotational movement thereof in one direction will cause said cam means to pull said cable means against the biasing force of said spring means so as to cause down-shifting of said shifting means, and rotation thereof in the opposite direction will release said cable means in the direction of the biasing force of said spring means so as to cause up-shifting of said shifting means;* wherein said cam means is configured so as to substantially compensate for chain gap variations in said derailleur shifting means.

10. A bicycle derailleur gear shifting system [as defined in claim 1,] *which comprises:*

*derailleur shifting means having return spring means operatively associated with the rear wheel of the bicycle;*

*handgrip shift actuator indexing cam means rotatably mounted on the bicycle handlebar substantially inboard of an end of the handlebar generally coaxially of the handlebar;*

*control cable means having one end operatively associated with said cam means and the other end operatively connected to said derailleur shifting means, said cable means being biased toward said derailleur shifting means by said return spring means;*

*said cam means being configured so that rotational movement thereof in one direction will cause said cam means to pull said cable means against the biasing force of said spring means so as to cause down-shifting of said shifting means, and rotation thereof in the opposite direction will release said cable means in the direction of the biasing force of said spring means so as to cause up-shifting of said shifting means;* wherein said derailleur shifting means is a rear derailleur shifting means, and said cam means is configured so as to cause said derailleur shifting means to move the bicycle chain a sufficient amount beyond the destination freewheel sprocket of said derailleur shifting means in a down-shifting event so that the chain will approach the destination sprocket in the same direction as it would in an up-shifting event.

11. A bicycle derailleur gear shifting system [as defined in claim 10, wherein] *which comprises:* derailleur shifting means having return spring means operatively associated with the rear wheel of the bicycle;

handgrip shift actuator cam means rotatably mounted on the bicycle handlebar generally coaxially of the handlebar;

control cable means having one end operatively associated with said cam means and the other end operatively connected to said derailleur shifting means, said cable means being biased toward said derailleur shifting means by said return spring means;

said cam means being configured so that rotational movement thereof in one direction will cause said cam means to pull said cable means against the biasing force of said spring means so as to cause down-shifting of said shifting means, and rotation thereof in the opposite direction will release said cable means in the direction of the biasing force of said spring means so as to cause up-shifting of said shifting means;

said derailleur shifting means being a rear derailleur shifting means, and said cam means being configured so as to cause said derailleur shifting means to move the bicycle chain a sufficient amount beyond the destination freewheel sprocket of said derailleur shifting means in a down-shifting event so that the chain will approach the destination sprocket in the same direction as it would in an up-shifting event;

said cam means [is] *being* configured so that said movement of the bicycle chain beyond said destination sprocket is insufficient to cause a double shift.

12. A bicycle derailleur gear shifting system [as defined in claim 10, wherein], derailleur shifting means having return spring means operatively associated with the rear wheel of the bicycle;

handgrip shift actuator cam means rotatably mounted on the bicycle handlebar generally coaxially of the handlebar;

control cable means having one end operatively associated with said cam means and the other end operatively connected to said derailleur shifting means, said cable means being biased toward said derailleur shifting means by said return spring means;

said cam means being configured so that rotational movement thereof in one direction will cause said cam means to pull said cable means against the biasing force of said spring means so as to cause down-shifting of said shifting means, and rotation thereof in the opposite direction will release said cable means in the direction of the biasing force of said spring means so as to cause up-shifting of said shifting means;

said derailleur shifting means being a rear derailleur shifting means, and said cam means being configured so as to cause said derailleur shifting means to move the bicycle chain a sufficient amount beyond the destination freewheel sprocket of said derailleur shifting means in a down-shifting event so that the chain will approach the destination sprocket in the same direction as it would in an up-shifting event;

said destination sprocket [is] *being* the largest freewheel sprocket, and said cam means [is] *being* configured so that movement of the bicycle chain beyond said destination sprocket is insufficient to cause the chain to derail from said destination sprocket.

13. A bicycle derailleur gear shifting system [as defined in claim 10, wherein], derailleur shifting means having return spring means operatively associated with the rear wheel of the bicycle;

handgrip shift actuator cam means rotatably mounted on the bicycle handlebar generally coaxially of the handlebar;

control cable means having one end operatively associated with said cam means and the other end operatively connected to said derailleur shifting means, said cable means being biased toward said derailleur shifting means by said return spring means;

said cam means being configured so that rotational movement thereof in one direction will cause said cam means to pull said cable means against the biasing force of said spring means so as to cause down-shifting of said shifting means, and rotation thereof in the opposite direction will release said cable means in the direction of the biasing force of said spring means so as to cause up-shifting of said shifting means;

said derailleur shifting means being a rear derailleur shifting means, and said cam means being configured so as to cause said derailleur shifting means to move the bicycle chain a sufficient amount beyond the destination freewheel sprocket of said derailleur shifting means in a down-shifting event so that the chain will approach the destination sprocket in the same direction as it would in an up-shifting event;

said cam means [is] *being* configured so that said movement of the bicycle chain beyond said destination sprocket is insufficient to cause the chain to rasp against the next sprocket beyond said destination sprocket.

14. A bicycle derailleur gear shifting system [as defined in claim 1] *which comprises:* derailleur shifting means having return spring means operatively associated with the rear wheel of the bicycle;

handgrip shift actuator indexing cam means rotatably mounted on the bicycle handlebar substantially inboard of an end of the handlebar generally coaxially of the handlebar;

control cable means having one end operatively associated with said cam means and the other end operatively connected to said derailleur shifting means, said cable means being biased toward said derailleur shifting means by said return spring means;

said cam means being configured so that rotational movement thereof in one direction will cause said cam means to pull said cable means against the biasing force of said spring means so as to cause down-shifting of said shifting means, and rotation thereof in the opposite direction will release said cable means in the direction of the biasing force of said spring means so as to cause up-shifting of said shifting means, wherein said derailleur shifting means is a front derailleur shifting means, and said cam means is configured with first and second locations which causes said derailleur shifting means to substantially align the bicycle chain with respective first and second derailleur chain wheels during parallel riding, and a third location which causes said derailleur shifting means to substantially align the chain with one of said chain wheels during cross-over riding.

16. In a bicycle derailleur gear shifting system having a rear derailleur shifting mechanism, a shift actuator *rotatably* mounted on a bicycle handlebar generally coaxially of the handlebar, said shift actuator being mounted on and engaged over an outside of the handlebar inboard of a fixed handgrip on an end of the handlebar, and control cable means operatively connecting said actuator to said shifting mechanism, a method of performing down-shifting events from a relatively smaller origin freewheel sprocket to a relatively larger destination freewheel sprocket, which comprises:

first [moving] *rotating* said shift actuator a sufficient amount to take up substantially all of the cumulative lost motion in said derailleur mechanism and said cable means; and then [moving] *rotating* said shift actuator a further amount [to] *so as* to move the bicycle chain at least substantially the distance between the centers of said origin and destination sprockets.

17. [A method according to claim 16, which comprises] *In a bicycle derailleur gear shifting system having a rear derailleur shifting mechanism, a shift actuator, and control cable means operatively connecting said actuator to said shifting mechanism, a method of performing down-shifting events from a relatively smaller origin freewheel sprocket to a relatively larger destination freewheel sprocket, which comprises:* first moving said shift actuator a sufficient amount to take up substantially all cumulative lost motion in said derailleur mechanism and said cable means;

then moving said shift actuator a further amount so as to move the bicycle chain at least substantially the distance between centers of said origin and destination sprockets; and minimizing said cumulative lost motion and making [it] *said cumulative lost motion* more predictable by providing said cable means with housing means that is substantially compressionless.

19. [A method according to claim 16, which comprises] *In a bicycle derailleur gear shifting system having a rear derailleur shifting mechanism, a shift actuator, and control cable means operatively connecting said actuator to said shifting mechanism, a method of performing down-shifting events from a relatively smaller origin freewheel sprocket to a relatively larger destination freewheel sprocket, which comprises:* first moving said shift actuator a sufficient amount to take up substantially all cumulative lost motion in said derailleur mechanism and said cable means;

moving said shift actuator a sufficient amount to substantially compensate for chain gap variations in said derailleur shifting [means] *mechanism;* and then moving said shift actuator a further amount so as to move the bicycle chain at least substantially the distance between centers of said origin and destination sprockets.

21. [A method according to claim 20,] *In a bicycle derailleur gear shifting system having a rear derailleur shifting mechanism, a shift actuator, and control cable means operatively connecting said actuator to said shifting mechanism, a method of performing down-shifting events from a relatively smaller origin freewheel sprocket to a relatively larger destination freewheel sprocket, which comprises:* first moving said shift actuator a sufficient amount to take up substantially all of the cumulative lost motion in said derailleur mechanism and said cable means; and then moving said shift actuator a further amount so as to move the bicycle chain at least substantially the distance between the centers of said origin and destination sprockets;

said method further comprising moving said shift actuator a sufficient amount to cause the bicycle chain to first move beyond said destination sprocket, and then moving said shift actuator back to cause the chain to move back to substantial alignment with said destination sprocket whereby the chain approaches the destination sprocket in the same direction as it would in an up-shifting event, wherein the bicycle chain is not moved beyond said destination sprocket a sufficient amount to cause a double shift.

22. [A method according to claim 20,] *In a bicycle derailleur gear shifting system having a rear derailleur shifting mechanism, a shift actuator, and control cable means operatively connecting said actuator to said shifting mechanism, a method of performing down-shifting events from a relatively smaller origin freewheel sprocket to a relatively larger destination freewheel sprocket, which comprises:* first moving said shift actuator a sufficient amount to take up substantially all of the cumulative lost motion in said derailleur mechanism and said cable means; and then moving said shift actuator a further amount so as to move the bicycle chain at least substantially the distance between the centers of said origin and destination sprockets;

said method further comprising moving said shift actuator a sufficient amount to cause the bicycle chain to first move beyond said destination sprocket, and then moving said shift actuator back to cause the chain to move back to substantial alignment with said destination sprocket, whereby the chain approaches the destination sprocket in the same direction as it would in an up-shifting event, wherein said destination sprocket is the largest freewheel sprocket, and wherein the bicycle chain is not moved beyond said destination sprocket a sufficient amount to cause the chain to derail from said destination sprocket.

23. [A method according to claim 20,] *In a bicycle derailleur gear shifting system having a rear derailleur shifting mechanism, a shift actuator, and control cable means operatively connecting said actuator to said shifting mechanism, a method of performing down-shifting events from a relatively smaller origin freewheel sprocket to a relatively larger destination freewheel sprocket, which comprises:* first moving said shift actuator a sufficient amount to take up substantially all of the cumulative lost motion in said derailleur mechanism and said cable means; and then moving said shift actuator a further amount so as to move the bicycle chain at least substantially the distance between the centers of said origin and destination sprockets;

said method further comprising moving said shift actuator a sufficient amount to cause the bicycle chain to first move beyond said destination sprocket, and then moving said shift actuator back to cause the chain to move back to substantial alignment with said destination sprocket, whereby the chain approaches the destination sprocket in the same direction as it would in an up-shifting event, wherein the bicycle chain is not moved beyond said destination sprocket a sufficient amount to cause the chain to rasp against the next sprocket beyond said destination sprocket.

27. A method as set forth in claim 16 further comprising operating said shift actuator to perform a series of indexed downshifts in each of which the chain of the derailleur mechanism is shifted from a relatively smaller orgin freewheel sprocket to a relatively larger destination freewheel sprocket, said method comprising for each downshift in said series:

first rotating the shift actuator a sufficient distance to take up substantially all of the cumulative lost motion in said derailleur mechanism and said cable means; and then rotating said shift actuator a further amount so as to move the bicycle chain at least substantially the distance between the centers of said orgin and destination sprockets.

* * * * *

(12) EX PARTE REEXAMINATION CERTIFICATE (5585th)
United States Patent
Patterson

(10) Number: US 4,900,291 C2
(45) Certificate Issued: Oct. 24, 2006

(54) BICYCLE GEAR SHIFTING METHOD AND APPARATUS

(75) Inventor: Sam H. Patterson, Chicago, IL (US)

(73) Assignee: Bank of America, N.A., Chicago, IL (US)

Reexamination Request:
No. 90/006,774, Sep. 11, 2003

Reexamination Certificate for:
Patent No.: 4,900,291
Issued: Feb. 13, 1990
Appl. No.: 07/293,521
Filed: Jan. 5, 1989

Reexamination Certificate B1 4,900,291 issued Apr. 25, 2000

Certificate of Correction issued Mar. 10, 1998.

Related U.S. Application Data

(63) Continuation-in-part of application No. 07/291,359, filed on Dec. 29, 1988, now abandoned, which is a continuation of application No. 07/141,625, filed on Jan. 6, 1988, now abandoned.

(51) Int. Cl.
*F16H 9/24* (2006.01)
*F16C 1/12* (2006.01)

(52) U.S. Cl. .................. 474/80; 74/488; 74/501.6
(58) Field of Classification Search ............. 474/78–80, 474/70; 280/278–279; 74/502.2, 501.6, 489, 74/505, 473.28, 527, 471.1, 481, 491, 473.14, 74/473.21
See application file for complete search history.

(56) References Cited

U.S. PATENT DOCUMENTS

| 619,103 A | 2/1899 | Weyde |
| 1,231,055 A | 6/1917 | Packard |
| 2,099,477 A | 11/1937 | Gruyer |
| 2,108,941 A | 2/1938 | Morgan |
| 2,874,587 A | 2/1959 | Schmid |

(Continued)

FOREIGN PATENT DOCUMENTS

| DE | 27 10 391 | 9/1978 |
| DE | 31 32 311 A1 | 3/1983 |
| DE | 32 15 426 | 10/1983 |
| DE | 37 19 421 A1 | 12/1988 |
| GB | 23643 | of 1910 |

(Continued)

OTHER PUBLICATIONS

AD–II Engineering's Motion for Partial Summary Judgment of Declaration of Invalidity, dated Aug. 31, 2004, 2 pages.
Memorandum in Support of AD–II Engineering's Motion for Partial Summary Judgment of Declaration of Invalidity, dated Aug. 31, 2004, 14 pages and attachments A–E.

(Continued)

*Primary Examiner*—Marcus Charles

(57) ABSTRACT

A bicycle derailleur gear shifting system having a rotatable handgrip actuator cam which is coupled with the derailleur shifting mechanism through a control cable system so as to control the derailleur mechanism. Separate actuator cams are associated with the front and rear derailleurs. For the down-shifting direction, at least the rear derailleur cam is configured so as to substantially compensate for increasing force of the derailleur return spring; so as to substantially compensate for numerous cumulative lost motions in the derailleur shifting mechanism and cable system, and for chain gap variations; and so as to overshift the chain a sufficient amount beyond the destination freewheel sprocket so that the chain will approach the destination sprocket in the same direction as it would in the up-shift direction, but not sufficient to cause a double shift, or derailling from the #1 sprocket. A front derailleur cam is configured to provide fine-tuning for "cross-over" riding.

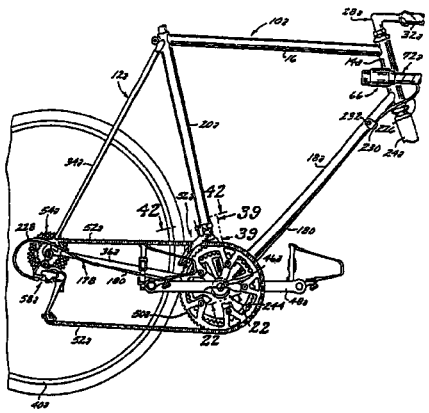

U.S. PATENT DOCUMENTS

| | | |
|---|---|---|
| 3,218,879 A | 11/1965 | Reed |
| 3,433,097 A | 3/1969 | Fox |
| 3,453,899 A | 7/1969 | Tarutani et al. |
| 3,522,745 A | 8/1970 | Milosevic |
| 4,030,774 A | 6/1977 | Foster |
| 4,132,119 A | 1/1979 | Nagano et al. |
| 4,222,286 A | 9/1980 | Huret |
| 4,260,171 A | 4/1981 | Foster |
| 4,261,449 A | 4/1981 | Foster |
| 4,279,174 A | 7/1981 | Ross |
| 4,688,440 A | 8/1987 | Okita |

FOREIGN PATENT DOCUMENTS

| | | |
|---|---|---|
| GB | 24430 | of 1910 |
| GB | 27842 | of 1910 |
| GB | 28683 | of 1910 |
| GB | 5320 | of 1911 |
| GB | 4543 | of 1912 |
| GB | 7514 | of 1914 |
| GB | 102083 | 11/1916 |
| GB | 153427 | 11/1920 |
| GB | 168109 | 8/1921 |
| GB | 179283 | 5/1922 |
| GB | 179459 | 5/1922 |
| GB | 197037 | 5/1923 |
| GB | 220859 | 8/1924 |
| GB | 225312 | 12/1924 |
| GB | 229015 | 2/1925 |
| GB | 230685 | 3/1925 |
| GB | 231915 | 3/1925 |
| GB | 233898 | 5/1925 |
| GB | 235469 | 6/1925 |
| GB | 248435 | 3/1926 |
| GB | 268643 | 4/1927 |
| GB | 274181 | 7/1927 |
| GB | 274643 | 7/1927 |
| GB | 274644 | 7/1927 |
| GB | 274670 | 7/1927 |
| GB | 281079 | 12/1927 |
| GB | 293501 | 7/1928 |
| GB | 306643 | 2/1929 |
| GB | 311029 | 5/1929 |
| GB | 325788 | 2/1930 |
| GB | 326159 | 3/1930 |
| GB | 330353 | 6/1930 |
| GB | 334731 | 9/1930 |
| GB | 334750 | 9/1930 |
| GB | 338342 | 11/1930 |
| GB | 338725 | 11/1930 |
| GB | 951131 | 3/1964 |
| GB | 1004357 | 9/1965 |
| GB | 2024381 | 1/1980 |
| IT | 399020 | 10/1942 |
| IT | 455397 | 2/1950 |
| IT | 460899 | 12/1950 |
| IT | 461222 | 1/1951 |
| IT | 531170 | 5/1954 |
| JP | 46-34180 | 11/1971 |
| JP | 48-2600 | 1/1973 |
| JP | 52-15033 | 2/1977 |
| JP | 57-99486 | 6/1982 |
| JP | 61-60387 | 3/1986 |
| JP | 56-143191 | 3/1986 |

OTHER PUBLICATIONS

L.R. 56.1 Statement of Material Facts Supporting AD–II Engineering's Motion for Partial Summary Judgment of a Declaration of Invalidity of Claim 16 of SRAM's '291 Patent, dated Aug. 31, 2004, 8 pages and attachments 1–10.

SRAM Corporation's Opposition to AD–II Engineering, Inc.'s Motion for Partial Summary Judgment of Invalidity of Claim 16 of U.S. Patent Reexamination Certificate No. B1 4,900,291, dated Sep. 27, 2004, 24 pages.

SRAM's Response to AD–II's Statement of Material Facts Supporting AD–II Engineering's Motion for Partial Summary Judgment of Invalidity of Claim 16 of SRAM's '291 Patent and SRAM's Statement of Additional Material Facts Requiring Denial of AD–II's Motion, dated Sep. 27, 2004, 15 pages and attachments 1–20.

Deposition of Edward Caulfield, Ph. D., P.E., dated Feb. 11, 2002, pp. 1, 16, 189–191, 193–196, 204, and 205.

Deposition of Robert H. Sturges, Jr., P.E., dated Dec. 19, 2001, pp. 1 and 174.

Responses of SRAM Corporation to AD–II's First Requests for Admission, pp. 1, 2, and 9.

Declaration of Dr. Robert H. Sturges, Ph.D., P.E. in Support of SRAM's Motion for Summary Judgment of Infringement of U.S. Patent Reexamination Certificate No. B1 4,900,291, Sep. 17, 2003, 4 pages and attachments A and B.

Letter from Packer Engineering, Inc. to Michael T. Brady dated Jan. 17, 2002, 4 pages and attachments.

Declaration of Dr. Robert H. Sturges, Ph.D., P.E. in Support of SRAM's Opposition to AD–II's Motion for Summary Judgment of Invalidity of Claim 16 of U.S. Patent Reexamination Certificate No. B1 4,900,291, Sep. 24, 2004, 9 pages and attachment A.

Le Cycle, entitled "The Centenary Trade Show" In French (no translation), Jan. 21, 1950, p. 10.

Le Cycle, entitled "No End in Sight for Bicycle Improvements" In French (no translation), Mar. 1960, p. 20.

Le Cycle, Saker advertisement entitled "2–Cable gear change twistgrip" In French (no translation), Jan. 1959, p. 20.

Le Cycle, entitled "The 1968 Tokyo Trade Fair" In French (no translation), 1968, p. 10.

Le Cycle, entitled "Current Trends" In French (no translation), Mar. 1969, pp. 23, 31.

Le Cycle, entitled "Novelties from the Brussels Trade Show" In French (no translation), Mar. 1969, p. 20, Fig. 5.

Suntour Accushift System Description, In Japanese (no translation), date unknown.

Accushift No Fault Shift Assurance, In Japanese (no translation), date unknown.

Suntour Bicycle Equipment Catalog, In Japanese (no translation), Edition No. 61, date unknown.

Suntour Proshop News, entitled "Thinking Off Road", In Japanese (no translation),, No. 14, date unknown.

Catalog of French Bicycle Parts, Advertisement for rotating handgrips by Astra, In French (no translation), p. 874, Circa 1950's.

Terrot Catalog, Catalog for Levocyclette with twist grip control, In French (no translation), p. 11, Mar. 4, 1919.

Radmarkt (Germany), Shimano advertisement allegedly showing indexed twistgrip shifter, in German (no translation), p. 36, Jan. 1966.

Radmarkt (German), Magura advertisement for alleged indexed twistgrip shifter, in German (no translation), p. 6, Mar. 1965.

Radmarkt (Germany), Shimano advertisement purportedly showing indexed twistgrip shifter, in German (no translation), p. 9, Feb. 1965.

Radmarkt (Germany), "Ketenschaltungen" (Derailleur Gearing); includes illustration of twistgrip control purportedly for use with indexed hub gear, In German (no translation), pp. 20–21, Feb. 1951.

Radmarkt (German), Magura advertisement for twistgrip control purportedly for use with indexed hub gear, In German (no translation), p. 4, 1960.

Radmarkt (German), Article about Cologne bicycle trade show featuring Magura twistgrip controls, In German (no translation), p. 33, 1960.

Radmarkt (Germany), "Bowden Cable Controls", In German (no translation), pp. 26–30, Mar. 1961.

Radmarkt (Germany), Purports to show Magura index twistgrip control used for gears on light motorcycle by Maico, In German (no translation), p. 42, Apr. 1950.

Gazelle, "Nieuws over de 3 versnel–lingnaal" (Holland), In German (no translation), Circa 1965.

Le Cycliste (France), Rotating handgrip "Serdes" advertisement, In French (no translation), Sep. 1949.

Sturney–Archer Catalog (German–language catalog used in Switzerland), Photos of twistgrip controls, In German (no translation), cover and p. 1, Circa 1970.

Magura Catalog (German), Purports to show indexed twistgrip devices, In German (no translation), pp. 19–20, 1986.

Unknown, In Japanese (no translation), date unknown.

Sun Tour Catalog, In Japanese (no translation), Jan. 1987.

Cyclo Gear Do. Catalog, Cyclo 3 speed, 4 speed, In English, pp. 36, 38, 1953.

Bicycle Guide: 1985 Buyers' Annual, Chart for "Mountain Bikes under $500" and "Mountain Bikes over $500", In English, 1985.

Bicycle Guide: 1987 Buyers' Annual, Chart for "Mountain Bikes under $500", In English, 1987.

Bicycling Shimano Ad, "The Unlimited Challenge" Shimano advertisement, 1985.

Bike Tech, Apr. 1985, Biomechanics of Shifting Performance Design of the Shimano New Dura–Ace Shifting System, In English, Jan. 1985–Apr. 1985.

Le Cycle, The Derailleur—Now an Indispensable Accessory, In French (includes partial English translation), pp. 43–47, Oct. 23, 1949.

Le Cycle, "Cyclo Novelties in England", In French (includes partial English translation), p. 57, Oct. 23, 1949.

Huffy Advertisement in American Cycling, "adult five–speed from Huffy", In English, (no page indicated), Apr. 1968.

JBM Catalog, Shimano "Rear Derailleur" and "Shifting Levers", In English, p. 21, 1974.

Shimano Catalog, '72 Shimano Bicycle Parts In English, 1972.

California Cycle Co., Inc. Catalog, Cyclo twist grip controls for use with Cyclo Benelux derailleur, In English, (no page indicated), 1938–1950.

New Cycling '87, "Sports Cycling Starting Age 40", vol. 25 No. 273, pp. 22, 23, 1987.

American Bicyclist and Motorcyclist, "Quick and Easy Adjustments for SunTour's Accushift", In English, p. 12, Jun. 1987.

SunTour Proshop News, "1983 New spring Version", In Japanese (partial English translation), vol. 3, No. 1, 1983.

JBM Catalog Sheets, In English, 1973/1982.

Cycling Sports, "Utility Cycling, '78" "Knowledge for the Cycling World: Inspection and Maintenance of Sports Bikes", In Japanese (partial English translation), p. 170, May 15, 1978.

Maeda Industries Catalog, SunTour Products, 1969.

Huret Catalog, Aris indexed derailleur system, In German and French (includes English translation), 1987.

SunTour Installation, Servicing and Troubleshooting Guide for Accushift Indexed Shifting Systems.

SunTour Proshop News, "Topic of the Year", In Japanese (no translation), 1979, No. 13.

SunTour Bicycle Equipment Catalog, "Syncho–Shift Mechanism", In Japanese (no translation), Edition No. 60.

Cycle Sport, "Shimano XT–SunTour SC Component", In Japanese (includes partial English translation), p. 40, Jan. 1, 1987.

Cycle Sport, "Campagnolo Syncho System", In Japanese (includes partial English translation), pp. 60–61, Mar. 1, 1987.

Cycle Sport, In Japanese (includes English translation), p. 114, Jul. 1, 1984.

New Cycling '85, "Shimano New Dura–Ace", In Japanese (no translation), pp 79–81, Apr. 1, 1985.

SunTour Through 1988, pp. 1–15, 1988.

Raleigh Industries Ltd., Pamphlet, 1962.

Sunset Magazine, "The new bikes and the new bike riders: here's help matching your needs with today's bike choices", Oct. 1986.

New Cycling, "Archery Double", In Japanese (includes English translation), p. 87, Feb. 1967, #30.

Shimano Catalog Sheets, 1970/1983.

Maeda Industries Pamphlet, SunTour Products, 1969.

Van Der Plas, The Mountain Bike Book, pp. 17, 34, 36, 37, 104, 105, 108 and 109, 1984.

The Dancing Chain (is not a prior art publication but discusses prior art), pp. 150, 237, 240, 251, 263, 281–283 and 310, 2000.

Le Cycle, "Cycle–touristic meeting some Details", p. 11, Dec. 1951.

SunTour Accushift–System Instruction Manual, In Japanese (includes English translation), date unknown.

SunTour Bicycle Equipment Catalog, Feb. 1985, Edition No. 62.

Radmarkt (Germany), Article about Swiss bicycle trade show with illustration of purported twistgrip–controlled electronic shifting indexed derailleur gears on a Villiger bicycle, In German, French and English, p. 45, Apr. 1987.

The Raleigh Book of Cycling, Purports to show Sturmey–Archer twistgrip illustration, pp. 76–77, 1975.

Sturmey–Archer Leaflet by Dutch Distributor, Purports to show twistgrip shifter, Circa 1968.

Sturmey–Archer Catalog, Purports to show twistgrip controls, pp. 4–7 (missing pp. 5–6), Circa 1980.

Sturmey–Archer Twist Shifter, 1963 (Photo).

Sturmey–Archer Twist Shifter, Circa 1962–1967 (Photo).

Terrot Levocyclette Twist Grip, 1905 (Photo).

Japanese Magazine, In Japanese (includes partial English translation), Apr. 1987.

SunTour Catalog, In Japanese (includes partial English translation), Feb. 1982.

Shimano, Double Cable Rotatable handgrip shifter for derailleur control, Circa 1969 (Photo).

Shimano, Rotatable handgrip shifter, Circa 1962 (Photo).

Super Champion, Rotatable handgrip shifter for derailleur control, Circa 1938–50 (Photo).
Magura, Rotatable handgrip shifter, Circa 1960 (Photo).
Gazelle, Rotatable handgrip shifter, Circa 1968 (Photo).
Shimano, Shimano Lark derailleur with "basic twistring" shifter, In Japanese (no translation), Circa 1972 (Photo).
Validity Opinion for U.S. Patent No. 4,900,291, Oct. 2, 2000.
SunRace Complaint (Allegations of Invalidity/Unenforce), Sep. 6, 2000.
SunRace's Response to Defendant's First Set of Interrogatories (Invalidity/Unenforce), Mar. 12, 2001.
AD–II's 2nd Amended Complaint (Never granted leave to file), May 24, 2001.
List of Prior Litigation.
Plaintiff's Final Invalidity Contentions, Oct. 15, 2003.
Plaintiff's Preliminary Invalidity Contentions, Mar. 3, 2001.
Declaration of Robert Van Der Plas, Jun. 14, 2001.
Deposition of Robert Van Der Plas, May 18, 2001.
AD–II Amended Complaint, Oct. 4, 2000.
Supplemental Answers of AD–II to SRAM's First Set of Interrogatories, Jun. 11, 2002.
AD–II's Rule 26(a) Initial Disclosure, Dec. 6, 2000.
Memorandum in Support of AD–II's Motion to Amend Its Pleadings, Dec. 3, 2001.
Memorandum in Support of AD–II Engineering's Motion to Amend Pleadings dated Mar. 19, 2004.
AD–II's Answer, Affirmative Defenses, and Counterclaims to Complaint in Case # 00 CV 6675 dated Feb. 7, 2001.
SunRace's Initial Disclosure of Prior Art dated Oct. 30, 2000.
Letter to Rick Walsh from Michael T. Brady dated Feb. 23, 2001.
AD–II Responses to SRAM's First Requests for Production of Documents and Things dated Feb. 23, 2001, pp. 1–32 and Certificate of Service page.
SRAM Corporation's Motion for Partial Summary Judgment Of Infringement of Claim 16 of U.S. Patent Reexamination Certificate B1 4,900,291 dated Sep. 19, 2003.
SRAM Corporation's Memorandum in Support of Its Motion for Summary Judgment Of Infringement of Claim 16 of U.S. Patent Reexamination Certificate No. B1, 4,900,291 dated Sep. 19, 2003.
SRAM Corporation's Statement of Material Undisputed Facts in Support of Its Motion for Summary Judgment of Infringement of Claim 16 of U.S. Patent Reexaminatin Certificate No. B1 4,900,291.
AD–II's Opposition to SRAM's Motion for Partial Summary Judgment on the '291 Patent dated Oct. 31, 2003.
AD–II's Response to SRAM's Statement of Material Undisputed Facts in Support of SRAM's Motion for Partial Summary Judgment Of the '291 Patent and AD–II's Statement of Additional Facts Requiring Denial of SRAM's Motion dated Oct. 31, 2003.
SRAM's Reply to AD–II's Response to SRAM's Statement of Material Undisputed Facts and SRAM's Response to AD–II's Statement of Additional Material Facts Regarding SRAM's Motion for Partial Summary Judgment of Infringement of Claim 16 of U.S. Patent Reexamination Certificate No. B1 4,900,291 dated Nov. 14, 2003.
SRAM Corporation's Reply Memorandum in Support of Its Motion for Summary Judgment of Infringement of Claim 16 of U.S. Patent Reexamination Certificate No. B1 4,900,291 dated Nov 14, 2003.
AD–II Engineering's Motion to Amend Pleadings dated Mar. 19, 2004.
Memorandum in Support of AD–II Engineering's Motion to Amend Pleadings dated Mar. 19, 2004.
SRAM Corporation's Memorandum in Opposition to AD–II's Motion to Amend Pleadings dated Mar. 29, 2004.
AD–II Engineering's Reply in Support of Its Motion to Amend Pleadings dated Mar. 30, 2004.
Amended Joint Claim Construction Chart for Claims 16 & 20 of U.S. Reexamination Certificate B1 4,900,291, Patent Local Rule 4–3 dated Jun. 15, 2001.
Joint Claim Construction Chart for Claims 16 & 20 of U.S. Reexamination Certificate B1 4,900,291, Patent Local Rule 4–3 dated Apr. 25, 2001.
Plaintiffs Sunrace Roots Enterprise Co., Ltd. and Sun Victory Trading Co., Inc.'s Opening Claim Construction Brief dated Jun. 15, 2001.
Declaration of Robert Van Der Plas in Support of Plaintiffs' Opening Claim Construction Brief dated Jun. 14, 2001.
Declaration of Laura C. Bremer in Support of Plaintiffs' Opening Claim Construction Brief dated Jun. 15, 2001.
Defendant / Counterclaimant SRAM Corporation's Claim Construction Brief dated Jun. 15, 2001.
Declaration of Keith J. Grady in Support of Defendant SRAM Corporation's Claim Construction dated Jun. 15, 2001.
Plaintiffs Sunrace Roots Enterprise Co., Ltd. and Sun Victory Trading Co., Inc.'s' Reply Claim Construction Brief dated Jun. 28, 2001.
Supplemental Declaration of Laura C. Bremer in Support of Plaintiffs' Reply Claim Construction Brief dated Jun. 28, 2001.
Defendant / Counterclaimant SRAM Corporation's Reply Claim Construction Brief dated Jun. 28, 2001.
Declaration of Keith J. Grady in Support of Defendant / Counterclaimant SRAM Corporation's Reply Claim Construction Brief dated Jun. 28, 2001.
Declaration of John David Cheever in Support of Defendant / Counterclaimant SRAM Corporation's Reply Claim Construction Brief dated Jun. 28, 2001.
Supplemental Declaration of Keith J. Grady in Support of Defendant / Counterclaimant SRAM Corporation's Reply Claim Construction Brief dated Jul. 10, 2001.
District Court Order, *SunRace v. SRAM*, Case No. C0003217 VRW dated Jul. 26, 2001.
Brief of Defendant–Appellant SRAM Corporation dated Oct. 22, 2002.
Joint Appendix, date unknown.
Corrected Brief of Appellees SunRace Roots Enterprises Co., Ltd. and Sun Valley Trading Co. Inc dated Dec. 3, 2002.
Reply Brief of Defendant–Appellant SRAM Corporation dated Dec. 17, 2002.
U.S. Court of Appeals for the Federal Circuit—Opinion, *SunRace v. SRAM*, Case No. 02–1524 dated Jul. 17, 2003.
Notice of Filing, AD–II Engineering, Inc., dated Oct. 8, 2004, 2 pages.
Local Rule 56.1 Reply Statement of Material Facts Supporting AD–II Engineering's Motion for Partial Summary Judgment Dismissing SRAM's Claim for Monetary Damages, dated Oct. 8, 2004, 2 pages.
Reply Memorandum in Support for AD–II Engineering's Motion for Partial Summary Judgment Dismissing SRAM's Claim for Monetary Damages, dated Oct. 8, 2004, 10 pages.

Local Rule 56.1 Reply Statement of Material Facts Supporting AD–II Engineering's Motion for Partial Summary Judgment of Declaration of Invalidity, dated Oct. 8, 2004, 6 pages.
Reply Memorandum in Support of AD–II Engineering's Motion for Partial Summary Judgment of Declaration of Invalidity, dated Oct. 8, 2004, 15 pages and attachments A–E.
Deposition of Edward Caulfield, Ph.D., P.E., dated Feb. 11, 2002, pp. 1, 184, 185, 189–202, 236.
Berto, et al., entitled "The Dancing Chain", (is not a prior art publication but discusses prior art), cover page, pp. 48–51, 307–308.
SRAM Corporation's Surreply in Opposition to AD–II's Motion for Partial Summary Judgement of Invalidity of Claim 16 of the Reexamined '291 Patent, dated Oct. 18, 2004, 9 pgs. and attachment 21.
Notice of Filing, AD–II Engineering, Inc., dated Nov. 3, 2004, 1 page.
Memorandum in Support of AD–II Engineering's Motion for Partial Summary Judgment of Declaration of Invalidity and Responding to SRAM Corporation's Sur–Reply, dated Nov. 3, 2004, 13 pages and Attachment A.
Transcript of Proceedings—Status/Motion, dated Oct. 18, 2004, 28 pages.
Transcript of Proceedings—Oral Argument, dated Jan. 26, 2005, 48 pages.
Order, dated Mar. 15, 2005, 4 pages.
Notice of Filing, Joint Stipulation and Statement of Issues of the Parties, dated Feb. 18, 2005, 9 pages.
Notice of Motion, Motion of AD–II Engineering for Entry of Injunction or, Alternatively, for Reconsideration, dated Feb. 7, 2005, 5 pages.
Memorandum of AD–II Support of Motion for Entry of Injunction or, Alternatively, for Reconsideration with Exhibit A attached, dated Feb. 7, 2005, 17 pages.
Transcript of Proceedings—Status, dated Mar. 14, 2005, 20 pages.
Order, dated Apr. 7, 2005, 4 pages.
Transcript of Proceedings—Status Before the Honorable Robert W. Gettleman, dated Feb. 8, 2005, 31 pages.
Transcript of Proceedings—Status Before the Honorable Robert W. Gettleman, dated Feb. 22, 2005, 26 pages.
Transcript of Proceedings—Status Before the Honorable Robert W. Gettleman, dated Apr. 7, 2005, 14 pages.
Notice of Appeal, dated Apr. 21, 2005, 2 pages.
Brief of Defendant–Appellant AD–II Engineering, Inc. dated Jun. 28, 2005, 51 pages with Addendum, Parts 1–9.
Materials Designated for Joint Appendix, Binder 1 of 2.
Materials Designated for Joint Appendix, Binder 2 of 2.
Memorandum Opinion and Order issued on Jul. 20, 2004, by the United States District Court for the Northern District of Illinois, in litigation styled *SRAM Corp.* v. *AD–II Engineering*, Case Nos. 00 C 6675, 01 C 0062 ("Slip op."), 10 pages.
Plaintiff–Appellee SRAM Corporation's Motion for Extension of Time to File Appellee's Opening Brief, 8 pages, Exhibit A, 2 pages, Exhibit B, 3 pages, dated Aug. 15, 2005.
AD–II Engineering's Opposition to Motion of SRAM Corporation for Extension of Time to File Appellee's Opening Brief, 4 pages, dated Aug. 16, 2005.
Plaintiff–Appellee SRAM Corporation's Reply in Support of Its Motion for Extension of Time to File Appellee's Opening Brief, 5 pages, dated Aug. 16, 2005.
Corrected Brief of Plaintiff–Appellee SRAM Corporation, 71 pages, dated Sep. 22, 2005.
Materials designated by SRAM to be included in the Joint Appendix Patent Owner SRAM Corporation's Response to Office Action dated Apr. 25, 2005, 14 pages, Exhibit A–E, Fax Cover Sheet, 1 page, Interview Summary, 2 pages, Declaration of Richard B. Walsh, Jr., in Support of Plaintiff–Appellee SRAM Corporation's Motion for Extension of Time of File Appellee's Opening Brief, 3 pages, Plaintiff–Appellee SRAM Corporation's Reply in Support of Its Motion for Extension of Time to File Appellee's Opening Brief, 5 pages.
Corrected Reply Brief of Defendant–Appellant AD–II Engineering, Inc., 35 pages, dated Oct. 6, 2005.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 4–27 is confirmed.

Claims 1–3 were previously cancelled.

\* \* \* \* \*